US011294415B2

(12) United States Patent
Schmidt et al.

(10) Patent No.: US 11,294,415 B2
(45) Date of Patent: Apr. 5, 2022

(54) DEVICE AND SYSTEM FOR CONTROLLING A TRANSPORT VEHICLE

(71) Applicant: Red Milawa Pty Ltd, Noble Park (AU)

(72) Inventors: Tilo Schmidt, Scoresby (AU); Brendon Ashley Savin, Scoresby (AU); Ashley Campbell Daff, Scoresby (AU)

(73) Assignee: RED MILAWA PTY LTD, Noble Park (AU)

( * ) Notice: Subject to any disclaimer, the term of this patent is extended or adjusted under 35 U.S.C. 154(b) by 0 days.

(21) Appl. No.: 16/997,791

(22) Filed: Aug. 19, 2020

(65) Prior Publication Data

US 2020/0393866 A1     Dec. 17, 2020

Related U.S. Application Data

(63) Continuation-in-part of application No. 16/739,061, filed on Jan. 9, 2020, now abandoned, which is a continuation of application No. 15/105,490, filed as application No. PCT/AU2014/001127 on Dec. 16, 2014, now abandoned.

(30) Foreign Application Priority Data

Dec. 17, 2013 (AU) ................................. 2013904918

(51) Int. Cl.
- *G05G 9/047* (2006.01)
- *A61G 5/04* (2013.01)
- *B66F 9/075* (2006.01)
- *B62B 5/00* (2006.01)

(52) U.S. Cl.
CPC ............... *G05G 9/047* (2013.01); *A61G 5/04* (2013.01); *A61G 5/048* (2016.11); *A61G 2203/14* (2013.01); *B62B 5/0069* (2013.01); *B66F 9/0759* (2013.01); *G05G 2009/04762* (2013.01)

(58) Field of Classification Search
CPC .... A61G 5/04; A61G 2203/14; B62B 5/0069; B66F 9/0759; G05G 2009/04762
See application file for complete search history.

(56) References Cited

U.S. PATENT DOCUMENTS

| | | |
|---|---|---|
| 3,374,845 A | 3/1968 | Selwyn |
| 3,990,319 A | 11/1976 | Hofer |

(Continued)

FOREIGN PATENT DOCUMENTS

GB      2479555 A      10/2011

OTHER PUBLICATIONS

ISA Australian Patent Office, International Search Report Issued in Application No. PCT/AU2014/001127, dated Feb. 10, 2015, WIPO, 10 pages.

*Primary Examiner* — Vicky A Johnson
(74) *Attorney, Agent, or Firm* — McCoy Russell LLP

(57) ABSTRACT

A controller for operative connection to a power assisted transport vehicle that is at least partially directed by a human operator in physical contact with the vehicle, the controller including: a contact surface with a deadman switch, a first sensor and a second sensor each responsive to manual actuation of the contact surface, each sensor having a respective first sensor output signal and a second sensor output signal, and a signal processing means adapted to process the first and second output signals, and control the mode of operation of the controller in accordance with the state of the deadman switch.

40 Claims, 17 Drawing Sheets

(56) References Cited

U.S. PATENT DOCUMENTS

| | | | |
|---|---|---|---|
| 4,078,627 A | | 3/1978 | Brown et al. |
| 5,445,233 A | | 8/1995 | Fernie et al. |
| 5,648,708 A | * | 7/1997 | Littlejohn ............... G01L 5/161 |
| | | | 318/488 |
| 6,354,390 B1 | | 3/2002 | Uchiyama et al. |
| 6,738,691 B1 | | 5/2004 | Colgate et al. |
| 8,712,614 B2 | | 4/2014 | Parker |
| 2003/0192728 A1 | | 10/2003 | Richey, II et al. |
| 2005/0121866 A1 | | 6/2005 | Kamen et al. |
| 2006/0229770 A1 | | 10/2006 | Strong |
| 2006/0283280 A1 | | 12/2006 | Szymanski et al. |
| 2007/0284845 A1 | | 12/2007 | Roovers et al. |
| 2010/0152987 A1 | | 6/2010 | Gorai |
| 2012/0018233 A1 | | 1/2012 | Chang et al. |
| 2016/0313758 A1 | | 10/2016 | Schmidt |

\* cited by examiner

TURNING

DEVICE AND SYSTEM FOR CONTROLLING A TRANSPORT VEHICLE

CROSS REFERENCE TO RELATED APPLICATIONS

The present application is a continuation-in-part of U.S. Non-provisional application Ser. No. 16/739,061 entitled "DEVICE AND SYSTEM FOR CONTROLLING A TRANSPORT VEHICLE," filed on Jan. 9, 2020, which is a continuation of U.S. Non-provisional application Ser. No. 15/105,490 entitled "DEVICE AND SYSTEM FOR CONTROLLING A TRANSPORT VEHICLE," filed on Jun. 16, 2016, which is a U.S. National Phase of International Patent Application Serial No. PCT/AU2014/001127 entitled "DEVICE AND SYSTEM FOR CONTROLLING A TRANSPORT VEHICLE," filed on Dec. 16, 2014. International Patent Application Serial No. PCT/AU2014/001127 claims priority to Australian Patent Application No. 2013904918, filed on Dec. 17, 2013. The entire contents of each of the above-cited applications are hereby incorporated by reference in their entirety for all purposes.

FIELD OF INVENTION

The present invention relates to the field of operation of vehicles for transporting people or a payload. In particular, the present invention relates to operation of vehicles that are partially or fully directed by a human operator, such as trolleys and wheelchairs.

In one form, the invention relates to a force and/or displacement responsive sensor controller for a transport vehicle that is at least partially directed by a human operator.

In another form, the invention relates to a method of operating a transport vehicle using a force and/or displacement responsive sensor controller.

It will be convenient to hereinafter describe the invention in relation to operation of a wheelchair. Equally, where the present invention is described with reference to a force responsive sensor controller, the present invention equally applies to both force and/or displacement responsive sensor controller. However, it should be appreciated that the present invention is not limited to that use only and can be applied to a wide range of transport vehicles.

BACKGROUND ART

It is to be appreciated that any discussion of documents, devices, acts or knowledge in this specification is included to explain the context of the present invention. Further, the discussion throughout this specification comes about due to the realisation of the inventor and/or the identification of certain related art problems by the inventor. Moreover, any discussion of material such as documents, devices, acts or knowledge in this specification is included to explain the context of the invention in terms of the inventor's knowledge and experience and, accordingly, any such discussion should not be taken as an admission that any of the material forms part of the prior art base or the common general knowledge in the relevant art in Australia, or elsewhere, on or before the priority date of the disclosure and claims herein.

Many types of vehicles exist today for the purpose of transporting a person or payload. Many are manually operated, that is, they are not power assisted and require the operator to hold onto handles to push and pull the vehicle and guide it in the desired direction. Examples of this type of vehicle include luggage trolleys, mobile patient beds and wheelchairs.

With reference to wheelchairs, an attendant often walks behind, pushing handles located behind a seat of the wheelchair. If the wheelchair is moving along a downward slope, the attendant must pull the handles to avoid uncontrolled acceleration. If the wheelchair is moving along an upward slope the attendant must push the handles. The physical stress on the attendant or operator can cause injuries and it is therefore becoming more acceptable to add some form of power assisted drive mechanism to wheelchairs to limit the strain imposed on the operator.

Vehicles such as forklifts, wheelchairs and trolleys typically have a joystick or throttle type twist grip to control the movement of the vehicle. Joystick and twist grip throttle controls are commonly available and require little if any training to use. However, joysticks are particularly difficult to master in applications where an operator walks behind a vehicle and they lack robustness because they include a number of moving parts that are prone to breakage. Twist grip throttle controls have the drawback of having a number of moving parts that can jam and require substantial ongoing maintenance to work smoothly.

One example of control devices of the prior art is described in U.S. Pat. No. 6,738,691 (Colgate et al) which relates to a control handle for intelligent assist device, robot or other powered system that is partially for fully directed by a human operator. The operation of the control handle is based on using a plurality of sensors to measure the force, torque or motion imparted by the human operator. It relates primarily to the control of a powered manipulation and positioning device such as an overhead crane for lifting and manipulation of a payload, in contradistinction to control or steering of a vehicle.

US patent application 2007/028845 (Roovers et al) relates to a wheel chair with drive support and hand force sensor. The hand force sensor comprises a force sensitive sensor part and a spring system which, during use, transmits hand force from a grip or wheel on which the hand force is applied to the force sensor. The spring system comprise two biased springs between which is a receive element that transmits the hand force to the spring system. However, there is a degree of inaccuracy inherent in the way this system responds to forces imparted by a hand onto the grip or wheel. For example, this system is not well adapted for control when the force of one hand (instead of both hands) is imparted to the wheel chair, or when the hand applies a backwards pulling force to reverse or tip the wheel chair to traverse a step.

British patent 247955 (Freeman) relates to a wheelchair having a power assist device that includes devices for measuring force applied to propulsion apparatus that drive the wheels. The drive provided to the wheels is proportional to force applied manually to the propulsion apparatus. A controller provides drive signals which are proportional to the measured forces applied to the handgrips on the handles of the wheelchair.

Another conventional wheelchair Attendant control has an 'Attendant Control' joystick mounted at the rear of the seat. The conventional form of control is also not always conducive to good posture (you are forced to drive with one hand all the time, and to steady the control you need to rest the palm of your hand on part of the chair), and takes time to learn to drive effectively. Also, the conventional form of control is typically positioned at one side of the chair, which is not always the most convenient side when manoeuvring in tight spaces. An example is disclosed in U.S. Pat. No. 5,648,708 (Littlejohn).

However, one of the problems associated with some prior art devices is that they have been found to not properly resolve all of the forces applied to the handles. For example, using two handles it is possible to steer the wheelchair, however it is not possible to steer the chair when using only one handle as is often required when holding open a door with one hand while manoeuvring the chair with the other hand. Again, there is a degree of inaccuracy inherent in the way this system responds to forces imparted on the handles, particularly when the operator pushes downward or upwards on the handles this will be incorrectly resolved as a backward or forward force on the handles respectively.

SUMMARY OF INVENTION

An object of the present invention is to provide a controller device that is safe, simple and intuitive to use.

A further object of the present invention is to alleviate at least one disadvantage associated with the related art.

It is an object of the embodiments described herein to overcome or alleviate at least one of the above noted drawbacks of related art systems or to at least provide a useful alternative to related art systems.

In a first aspect of embodiments described herein there is provided a controller adapted to enable control of a drive mechanism for a power assisted transport vehicle that is at least partially directed by a human operator in physical contact with the vehicle, the controller including at least one contact surface associated with the transport vehicle, and having a switch associated with the contact surface;

a first sensor and a second sensor each responsive to actuation of at least one contact surface, each sensor having a respective first sensor output signal and a second sensor output signal, and a signal processing means adapted to process the first and second output signals, and impart corresponding drive control signals to the drive mechanism wherein the signal processing means provides a selection of predetermined modes of operation of the controller in response to the switch being activated or not activated.

In a preferred aspect of invention, the controller as herein disclosed has predetermined modes of operation are, any one of:

Mode 1—STANDBY mode—no switch(s) are activated;
Mode 2—LEFT HAND mode—the switch on a left hand contact surface for left handed operation is activated;
Mode 3—DUAL mode—a left hand switch on a left hand contact surface and a right hand switch on a right hand surface are both activated; and
Mode 4—RIGHT HAND mode—the switch on a right hand contact surface for right handed operation is activated.

The contact surface may be of any conformation suitable for actuation by force imparted from a body part of a human operator. The force and/or displacement may be imparted, for example, from the operator's hand, finger, head, arm (such as the elbow), shoulder or leg (such as the knee or ankle) and the contact surface appropriately configured for convenient use with the body part. Preferably the contact surface comprises a handle, joystick, contact pad or headrest appropriately contoured for contact with a specific body part.

Typically, the actuation comprises input in the form of force and/or movement imparted by the human operator. In one embodiment the movement in the X-axis direction and/or the Z-axis direction is proportional to the force imparted to the contact surface in the respective X-axis direction and/or the Z-axis direction.

Thus, when the controller is being subjected to manual control, manual force by one hand on a single contact surface can be detected by the sensors and resolved by the signal processor into spatial components in two dimensions (relative to an X-axis and Z-axis) to control the direction and speed of the vehicle, leaving the operator's other hand free if required.

In another preferred embodiment the first and second sensors are responsive to a single handle (a first handle) also having an associated switch. In an alternative embodiment, two handles, one or more of which handles may be associated with a switch(es), (a first handle responsive to a first sensor and a second handle responsive to a second sensor) may be utilised with the forces and/or displacement applied to the handles being resolved by the signal processor. In a particularly preferred embodiment, a human operator may alternate between directing the vehicle by (i) imparting physical force and/or displacement to the first contact surface, or (ii) imparting physical force to both the first and second contact surfaces simultaneously. Preferably the human user can alternate between state (i) and (ii) while the vehicle is in motion or stationary. Accordingly, in another embodiment, the controller includes a third sensor and a fourth sensor each responsive to actuation of a further handle, the signal processor being adapted to process output signals of all four sensors.

The signal processor is typically some form of logic means used to calculate resolution of the output signals from the sensors into component forces and to apply control algorithms to the signals to ensure smooth and safe control of the vehicle. For example, when the vehicle is being manually controlled by a control handle, the control handle may additionally include a safety mechanism that only allows the vehicle to operate if the operator is holding on to at least one control handle. This might consist of a mechanical switch lever that the operator must activate while in control of the vehicle (commonly known as a "deadman" switch) or some other sensor type to detect the presence of the operator's hand on the control handle. The deadman switch also performs the role of signalling to the electronics which of the handles are to be in control at any given time and thus defining the mode of operation. That is, the safety switch effectively determines from which control handle(s) it will process signal data.

The present invention thus provides the ability to steer and control the drive assistance mechanism directly through manual actuation of a single contact surface such as a handle, ordinarily used for manually pushing the vehicle. In contrast, similar controllers of the prior art require both handles to be actuated to steer.

In a preferred embodiment the present invention also provides the ability to switch between the control handles while stationary or while driving. Importantly, this feature achieves the underlying goal of the control handle(s), which is to mimic how a non-motorized device would be pushed but with the added assistance of the power assistance. For example, when manually pushing the transport vehicle of the present invention, it is possible to switch between single handed and two-handed operation at any time while still being able to steer the vehicle in most circumstances. In the power assisted transport vehicle, the response of the vehicle is automatically triggered and there is no extra force or effort required for the user between single or two-handed operation. The single handed or two-handed operation provides a superior level of control compared to a manual system of the prior art.

In a second aspect of embodiments described herein there is provided a transport vehicle comprising the controller of the present invention.

In the case of a wheelchair, actuation force, such as manual force, may be applied to the controller by the occupant of the wheelchair or an assistant, such as someone pushing the wheelchair. Thus, for example, using a single handle on the controller, an operator seated in the wheelchair, or walking beside or behind the wheelchair can control the steering and drive speed in both forward and reverse directions.

The ground engaging members may be any convenient mobility device such as wheels, casters, rollers or tracks.

In other types of vehicles force applied to the contact surface may optionally control functions of components other than the ground engaging members. Further sensors may be added to achieve this. For example, it could control the upward and downward motion of a fork in a forklift vehicle.

Typically, the sensors are of any type suitable for measuring displacement, pressure and/or force.

Types of control include, but are not limited to Joysticks which can provide signals based on;
Displacement (senses movement of the joystick lever)
Force (senses force on the joystick lever)
Pressure (pressure mat)

While some embodiments of the present invention use Force sensing as a means of control because it is considered to be an effective form of control for the 'attendant' controlling a device (off board control), it should also noted that the present invention is adapted to work with displacement sensing which is often preferred for an occupant driving a vehicle (on board control).

The Deadman switch as influencing modes of operation according to aspects of invention in embodiments of the present invention is capable of working with force, pressure and/or displacement based controllers.

An example of where displacement sensing could be used is when the occupant of the wheelchair (for example) wants to drive the wheelchair using a Displacement Joystick for each hand (push pull steering, etc). Note that displacement based control is often preferred when driving a vehicle (e.g. consider the example of driving a car, the accelerator pedal is a displacement device).

Wheelchairs are commonly driven with a displacement joystick that has 2 axis, forwards/backwards and left/right.

Aspects of the present invention allow for two of these joysticks to be used (one for each hand, etc.), with a Deadman switch on each joystick allowing the system to know which joystick (or none or both) to use for driving. This would enable the wheelchair user to drive with both hands (push pull steering), and at any time swap to one joystick, whichever is convenient at any point in time. This system would also be convenient if an attendant needs to drive the chair, being able to drive it from one joystick, whichever is most convenient.

For example, suitable sensors include load cells, piezoelectric devices, pressure sensing resistors, joystick, pressure mat or any other suitable displacement, pressure and/or force/pressure/displacement sensing element(s). The sensors are arranged within the control handle in a manner that allows the forces manually applied to the contact surface of the controller to be independently resolved into component forces in each of the relevant axes.

The forces acting on the handle and detected by the sensors are resolved by a logic means into spatial components. The forces may be coplanar thus resolved in two dimensions relative to coordinate Z and X axes. Alternatively, they may be resolved into any or all of the 8 available degrees of freedom if the forces are concurrent, parallel, non-concurrent, non-parallel or rotational.

The present invention could be used for operation of a wide range of vehicles including, for example, electric wheelchairs, forklifts of the "walk-behind" type and others, luggage trolleys, goods trolleys, golf bag buggies. In particular, with reference to wheelchairs the controller may be used by a wheelchair user or the carer who walks behind, propelling the wheelchair by pushing or pulling handles provided behind the seat of the wheelchair.

Other aspects and preferred forms are disclosed in the specification and/or defined in the appended claims, forming a part of the description of the invention.

In essence, embodiments of the present invention stem from the realization that having force and/or displacement sensors in direct interaction with a contact surface such as a control handle provides a significantly improved resolution of forces and/or displacement and concomitantly better directional control by an operator. The present invention can properly resolve all the forces and/or displacement imparted to a handle in the Z and X directions (and optionally the Y direction and rotation) to accurately control the direction of movement of a vehicle. In particular, the present invention differs from the prior art by providing a deadman switch in association with one or more handles. The deadman switch has two functions. Firstly, a safety function. The if deadman switch is not pressed or activated, the drive mechanism will not drive. Secondly, the deadman switch(es) provide a single or dual handle operation depending on whether one or two deadman switches are activated, and which deadman switches are activated. If the deadman switch on the right handle only is activated, then the right hand handle will determine the operation of the drive mechanism. If the left hand deadman switch only is activated, then the left hand handle will determine the driving operation, and if both deadman switches on both the right and left hand handles are activated, then both handles will determine the drive operation more accurately measuring and resolving all of the forces imparted to one or more control handles by an operator.

Advantages provided by the present invention comprise the following:

it provides an operator with a robust control input device for driving and controlling a vehicle, such as an electrically controlled vehicle;

it is more intuitive than controllers of the prior art, requiring little, if any, operator skill or training;

allows the vehicle to be operated by an attendant in a manner that is almost identical to vehicles fitted with controllers of the prior art but with greater manoeuvrability and more intuitiveness and none of the inherent drawbacks associated with the improper resolution of the control forces acting on the control surface;

improved reliability and safety due to a minimum of moving parts;

can be retrofitted to existing vehicles to improve performance;

requires less than 20 kg of force to operate as stipulated by many work safety regulatory authorities;

can be used in a wide range of practical situations and locations;

will operate reliably over non-ideal terrain including ramps and uneven ground;

Relatively easy to learn to 'push' the wheelchair (if you can push a manual wheelchair, you have the skills required to 'push' the power chair which has mobility handles).

There is a reduction in health and safety risks associated with the relatively high forces that can be associated with pushing loaded manual chairs;

Better posture associated for the attendant, particularly when walking directly behind the chair driving with 2 handles;

The drive operation can swap from double handed operation to single handed operation when required, allowing the chair to be manoeuvred in relatively tight spaces with a hand on either one of the two available handles, whichever is the most convenient to reach by the operator at the time.

Further scope of applicability of embodiments of the present invention will become apparent from the detailed description given hereinafter. However, it should be understood that the detailed description and specific examples, while indicating preferred embodiments of the invention, are given by way of illustration only, since various changes and modifications within the spirit and scope of the disclosure herein will become apparent to those skilled in the art from this detailed description.

BRIEF DESCRIPTION OF THE DRAWINGS

Further disclosure, objects, advantages and aspects of preferred and other embodiments of the present application may be better understood by those skilled in the relevant art by reference to the following description of embodiments taken in conjunction with the accompanying drawings, which are given by way of illustration only, and thus are not limitative of the disclosure herein, and in which.

DETAILED DESCRIPTION

Figure 1:
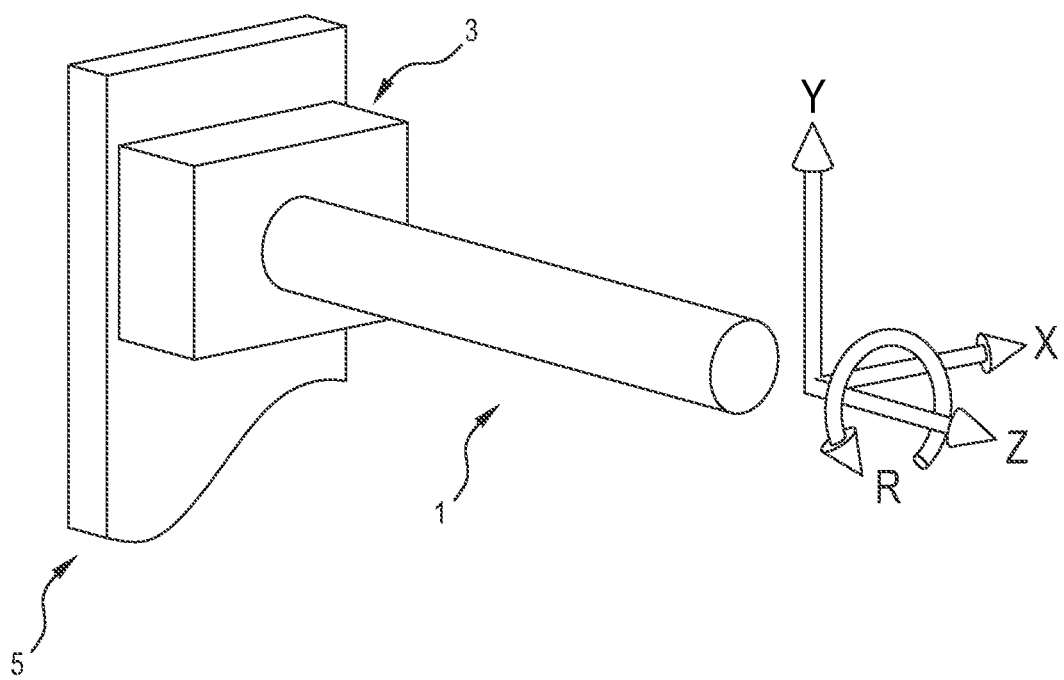
FIG. 1 illustrates in perspective view an example of the physical layout of a controller according to the present invention.

The purpose of the 'mobility handles' device in accordance with an aspect of the present invention is to be able to push or pull a Power wheelchair in the same or similar manner as pushing or pulling a Manual wheelchair, but with the added benefit of the power assistance which ensures that the push and pull force required is minimized to levels that are relatively gentle and safe on the attendant, taking into account the terrain and weight being transported.

The mobility handles are designed to mimic pushing a manual chair, there is one mounted on each side of the chair in a similar position to the handles of a manual chair. Of course, the handles may be positioned at any location on the device to be driven, depending on the requirement of the device operator. In pushing a manual chair, people often walk behind the chair with both hands touching the handles. Also, for a manual chair, at times when it is not possible to stay directly behind the chair (e.g. when manoeuvring in tight spaces) the operator may wish to continue to drive with a hand contacting only 1 of the 2 handles, leaving the other hand free if required or for other functions, such as opening a door.

To mimic the effect of a manual chair, the mobility handles control drive in 2 axis, the first axis being forward/reverse and the 2nd axis being left/right, from forces on the handles that are in the fore/aft direction, and in the Left Right Direction. There is a safety switch(es) that detects if a hand is in place on any or both handle(s). The signals from each handle will only be acted on if the 'hand detection' switch is activated. While this is a key safety element to determine that drive is only possible while the person is touching the handles, it is also provides an inventive control of the modes of operation of the present invention, as the signals required also enable the control system to know which handle(s) it received input from and thus the corresponding mode of operation.

Examples which are detail further herein are;

a. both switches are active, the handles are in 'dual control mode'.

b. the switch for the Left handle only is active, then the handles are in 'single control mode', operating from the left handle only.

c. the switch for the Right handle only is active, then the handles are in 'single control mode', operating from the right handle only.

d. If no switches are active, then drive is disabled. If the chair is driving at speed when the attendant lets go of both handles, then the chair will come to a controlled stop.

The switches may be continuously be held down or pressed in order to be 'activated', or in another embodiment, the switches may require to be pressed or activated only once 'on' or 'off' in order to provide activation.

An extension of the handle control is also responsive to a 3rd axis, typically being a power seating function that responds to upward or downward forces on the handles causing the seat to adjust accordingly. As an example, the 3rd axis could control the power Tilt function, this could be particularly useful when 'pushing' the chair outdoors, when approaching obstacles the chair can be tilted back for leg rest clearance, and also the Tilt could be adjusted for descending/ascending steep slopes, as will be detailed further herein. A further extension of the handle control is also responsive to a $4^{th}$ axis, typically being a 'R' rotational direction. As an example, the rotational direction or 4th axis of movement may enable to control other functions of the power assisted vehicle and/or to control functions such as lift and/or tilt where appropriate.

FIG. 1 illustrates an example of the physical layout of a controller according to the present invention.

The controller includes a contact surface in the form of a handle (1) which is attached to one or more force sensors (not shown) within the housing (3), and a signal processor (not shown) that processes electrical signals from the force sensors using an appropriate algorithm to generate a drive signal for the motor driving ground engagement means such as wheels. The sensor housing (3) is supported via a mounting bracket (5) on the motorized base.

In the embodiments disclosed herein, the sensors may be force sensors, displacement sensors and/or pressure sensors. An example of a force sensor is a load cell. An example of a displacement sensor includes proportional Joysticks (various types including inductive), the throttle pedal of an Electronic Throttle control system, etc. An example of a pressure sensor is a pressure mat, but other embodiments may include pressure sensing resistors or any other suitable force, displacement and/or pressure sensing element(s). The load cells are arranged within the control handle in a manner that allows the forces applied to the control handle to be independently resolved into component forces indicated in each of the relevant axes X, Y, Z with R indicating rotational force.

The controller as will be described further herein allows an operator walking beside or behind a power assisted vehicle to control the drive speed; forward and reverse; and the steering (and possibly additional functions) of the vehicle. An attendant can operate the controller in a way that is almost identical to operating vehicles of the prior art.

Figure 3:
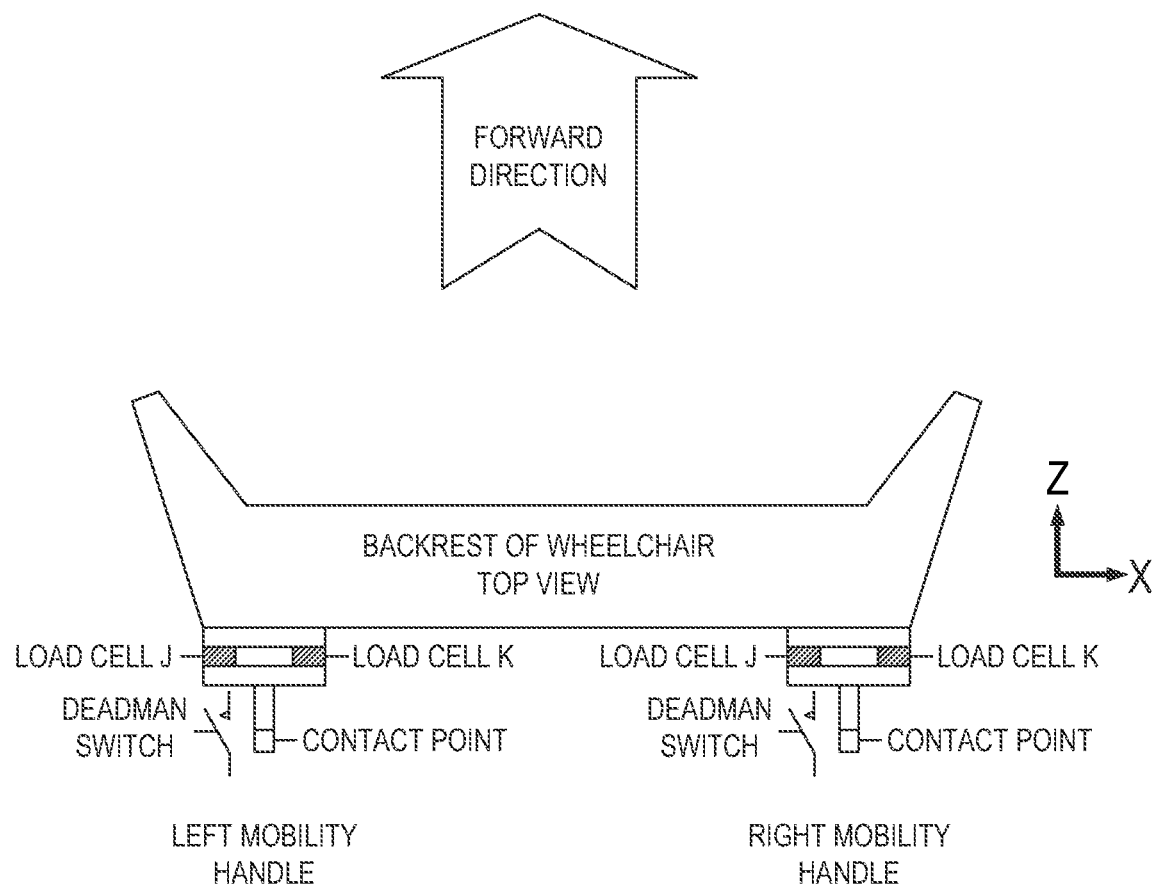
FIG. 3 illustrates a partial view of one example implementation of the present invention as applied to a wheelchair.

The mechanical arrangement of the sensors is such that the forces on the handle are able to be resolved into the component forces in the relevant axes. This can best be explained by way of examples:

Example 1: Two contact surfaces in the form of control handles (each as depicted in FIG. 1) are fitted to the back of a power assisted wheelchair (for example as illustrated in FIG. 3). The attendant grips a handle with each hand and pushes in the direction of the Z-axis to make the chair move in the forward direction. If, as is common, the attendant also leans on the handles while pushing the chair, another force is applied to the handles in the downward direction. The total resultant force and direction is now no longer just in the desired Z-axis direction.

Figure 2A:
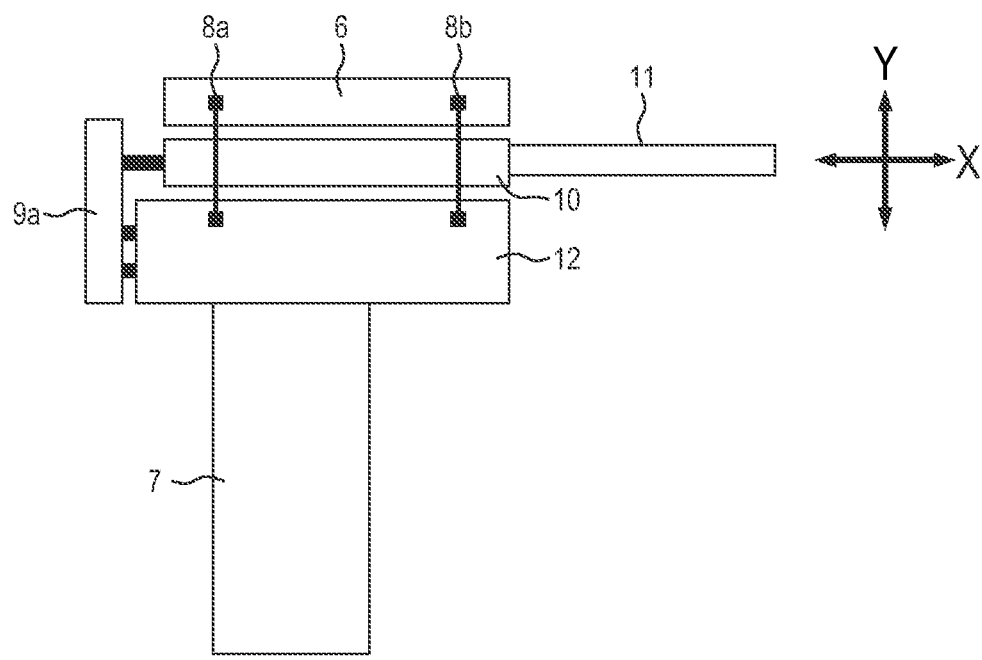
FIGS. 2A, 2B, 2C, and 2D illustrate in cross-sectional plan view one embodiment of a controller according to the present invention in side view (FIG. 2A), top view (FIG. 2B), schematic view (FIG. 2C) and perspective view (FIG. 2D)
Figure 2B:
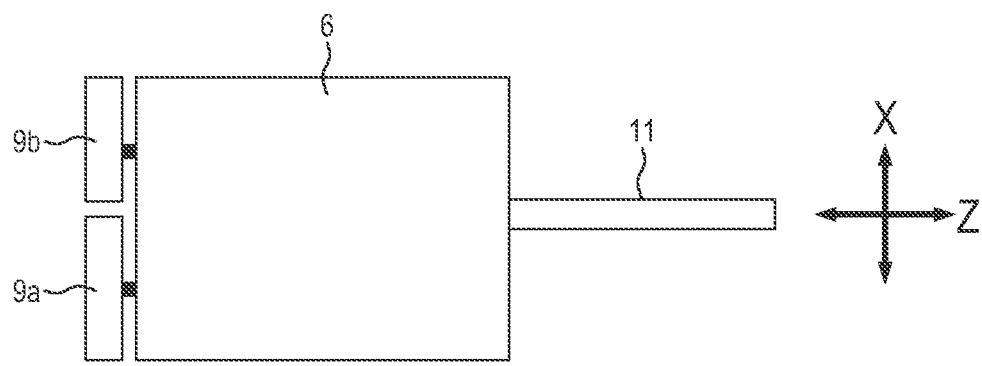

Using this conformation of the controller, there are two preferred embodiments; (a) the signal from the sensor is such that either the attached controller can separate the signals into the relevant directions and thus be able to ignore the unwanted forces due to leaning on the handles (or use them to control other functions) or (b) the mechanical arrangement of the contact surface of the handle is such that the unwanted force from leaning on the handles can be isolated (as shown in FIGS. 2A and 2B).

Example 2: Again with reference to two handles or contact points as depicted in FIG. 1, the attendant might need to carry a bag in one hand and push the wheelchair using the other hand. To accomplish this, the attendant will engage the respective deadman switch integral or associated with the handle as will be described herein later and intuitively push on the contact surface in the form of a handle in the Z-axis direction to move the chair forward, but would also apply a lateral force to the handle in the X-axis direction to maintain a straight course or to steer around corners when required. The controller will therefore need to resolve the independent component forces in the Z and X axes to control the wheelchair correctly. This is depicted and described later with reference to FIGS. 5 to 8.

The mechanical arrangement of the contact surface and the force sensors is such that the attached controller is able to resolve forces in the X-axis—to steer the vehicle left/right—and in the Z-axis—to control the forward/reverse speed. The signals proportional to the forces applied in the Y-axis and the rotational forces R might also be used by the attached controller to control other functions of the power assisted vehicle.

The signals resolved in the X-axis will be used to steer the motorised base vehicle left and right. The signals resolved in the Z-axis direction will be used to set the drive speed and direction (forward and reverse).

In one preferred embodiment, the signal resolved for the Y-axis direction and the 'R' rotational direction are used to control other functions such as lift and/or tilt where appropriate.

The location and physical arrangement of the sensors must be such that the forces in the various axes can be independently resolved. One preferred embodiment for achieving this is depicted in FIG. 2A which illustrates a side view of a controller showing preferred locations of the sensors so that the forces in the various planes can be independently resolved.

Specifically FIG. 2A depicts three plates (6,10,12). The plates may be metal, or constructed of any other convenient materials or combinations of materials. Two of the plates (6, 12) are attached to a support (7) on the vehicle, such as the handle of a wheelchair. The middle plate (10) is attached to a first sensor (9a) and contact surface of the handle (11) and has a small degree of freedom to slide relative to the upper and lower plates (6, 12), subject to the application of the bolts (8a,8b). The first sensor (9a) and second sensor (9b) are attached between two of the plates (10, 12). The first sensor (9a) and second sensor (9b) will therefore measure the forces in the X and Z axial directions only and remain unaffected by forces imparted in the Y-axis direction. As in example 1 above, leaning on the handles has no effect on the control forces in the X or Z-axes.

FIG. 2B illustrates a top plan view of the controller of FIG. 2A. In this view the first sensor (9*a*) and the second sensor (9*b*) can both be seen, along with the handle (11) and the upper plate (6).

Figure 2C:
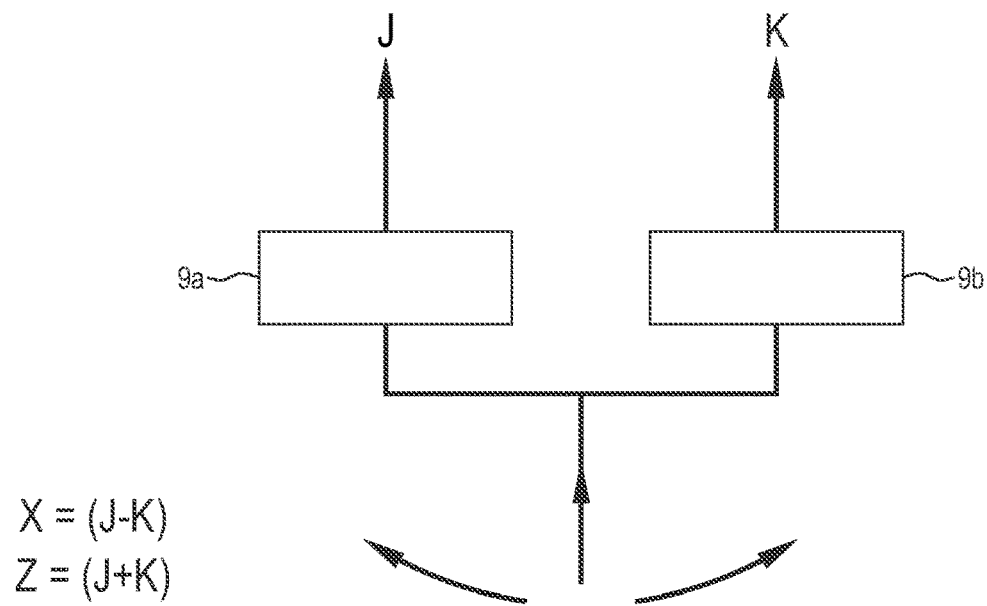

FIG. 2C illustrates an example; load cell which has a J sensor and a K sensor and the effects of manual force imparted to the handle (11) of the controller of FIG. 2A provides the J and K output signals which are processed in order to provide drive control according to the present invention. If the signals from the J and K sensors (9*a*) and (9*b*) are J and K signals respectively then with the first sensor (9*a*) and the second sensor (9*b*) mounted as shown, the resultant signal for forces in directions Z (for forward/reverse) and X (left/right) will be: Z=J+K and X=J−K. these are used in accordance with the present invention and are described further herein.

Figure 2D:
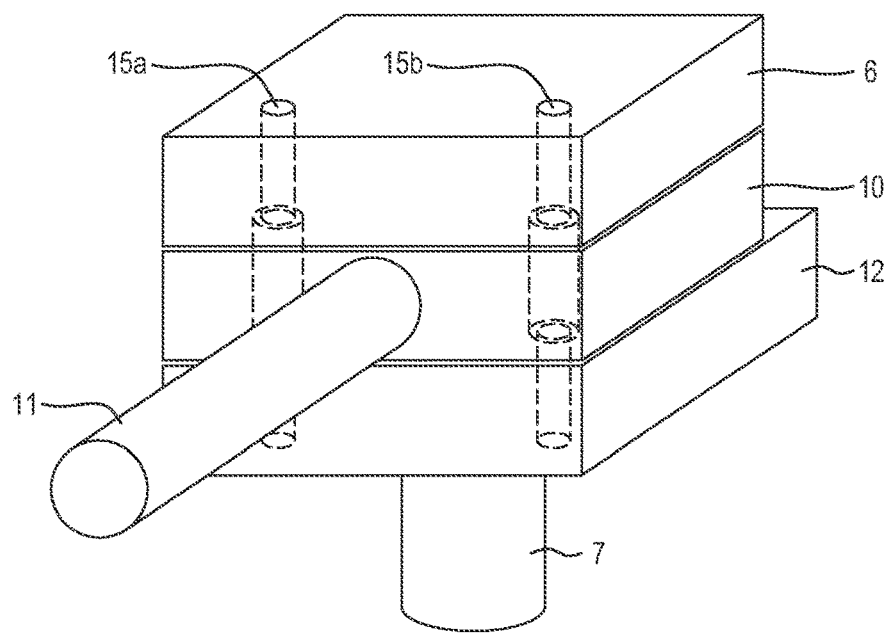

FIG. 2D illustrates the 'sandwich' structure of the plates (6, 10, 12) and handle (11) in isolation. The plates are held together by two bolts (8*a*, 8*b*—not shown in this view) that are located in holes (15*a*, 15*b*) that pass through all three plates. The diameter of the holes (15*a*, 15*b*) is slightly greater where it passes through the second plate (10), as compared with the other two plates (6, 12). Thus, slight movement of plate 10 relative to plates 6 and 12 is permitted in the horizontal plane and this is sufficient for operation of the force sensors (9*a*) and (9*b*). In other vehicles such as forklifts, it may be useful to have a mechanical arrangement that also allows measurement of the vertical forces in the Y axis of the middle plate (10) relative to the other plates (6, 12). This could be achieved for example by including one or more load cells to measure the Y axis forces that the middle plate (10) exerts on the top plate (6) or the bottom plate (12).

Other embodiments are depicted in FIGS. 9A to 14, and are further described herein, and comprising different combinations of mechanical isolation and sensor arrangement can be conceived to provide the same result.

FIG. 3 illustrates a schematic view of one example implementation of the present invention as applied to wheelchair handle(s), in which the handles (left and Right) are located on each side of a backrest of a wheelchair where the handles of a manually operated wheelchair would have handles located.

Figure 4A:
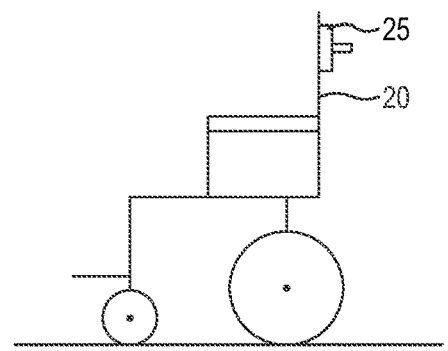
FIG. 4A, FIG. 4B and FIG. 4C illustrate three different applications of the controller according to the present invention, for a wheelchair (FIG. 4A), a luggage trolley (FIG. 4B) and a forklift (FIG. 4C) noting that the present invention is not limited only to those applications illustrated.
Figure 4B:
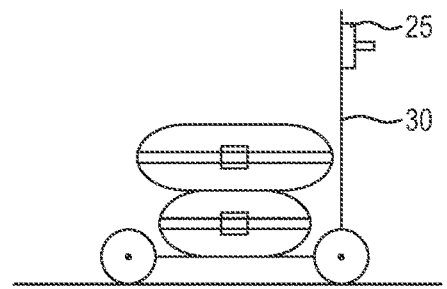
Figure 4C:
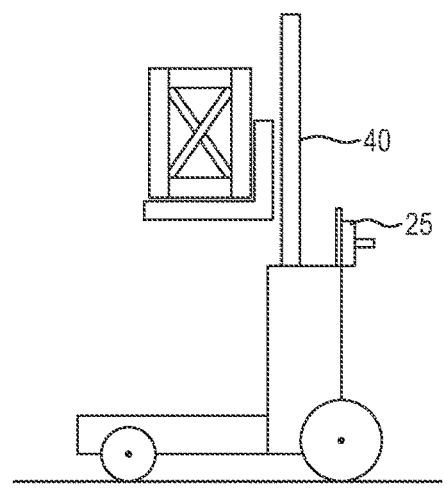

FIGS. 4A, 4B and 4C illustrate three different applications of a controller (25) according to the present invention, for (A) a wheelchair (20), (B) a luggage trolley (30) and (C) a forklift (40). The controller could be used for a wide range of devices for moving people and goods, such as at airports, seaports and resorts; hospitals, nursing homes and other care facilities; warehouses and other storage facilities.

The principle of operation for the drive mechanism of the present invention is to process the signals from 2 load cells in accordance with the sensed state of each deadman switch.

Referring to FIGS. 1 and 2C, each load cell may provides a J and K signal representing forces as applied to each load cell. With this in mind, the signals may be interpreted to resolve drive control as:

$$X=J-K$$

$$Z=J+K$$

While a dual only control system would only need 1 load cell in the left handle, and 1 load cell in the right handle, the single control mode to be described herein later has each handle containing 2 load cells (mounted on the left and right of the handle assembly).

There are 4 modes of operation, the mode being dependent on which 'Deadman' switch sensing in each handle.

Mode 1—STANDBY mode—both safety switches are released (system knows that the person is not controlling the chair at the moment)

Mode 2—Single Control mode, LEFT HAND control mode—safety switch of the Left mobility handle is pressed (system knows that only the left hand is being used)

Mode 3—DUAL control mode—safety switch of both mobility handles are pressed (system knows that both hands are being used). If the 'Signal Combiner' performs an average function of the load cells in each handle, sideways force on the mobility handles is ignored. Steering signal (X) is determined by the difference in push/pull force between the Left and Right handle.

Mode 4—Single Control mode, RIGHT HAND control mode—safety switch of the Right mobility handle is pressed (system knows that only the right hand is being used).

The modes are described in more detail as follows with reference to FIGS. 5 to 8.

Figure 5:
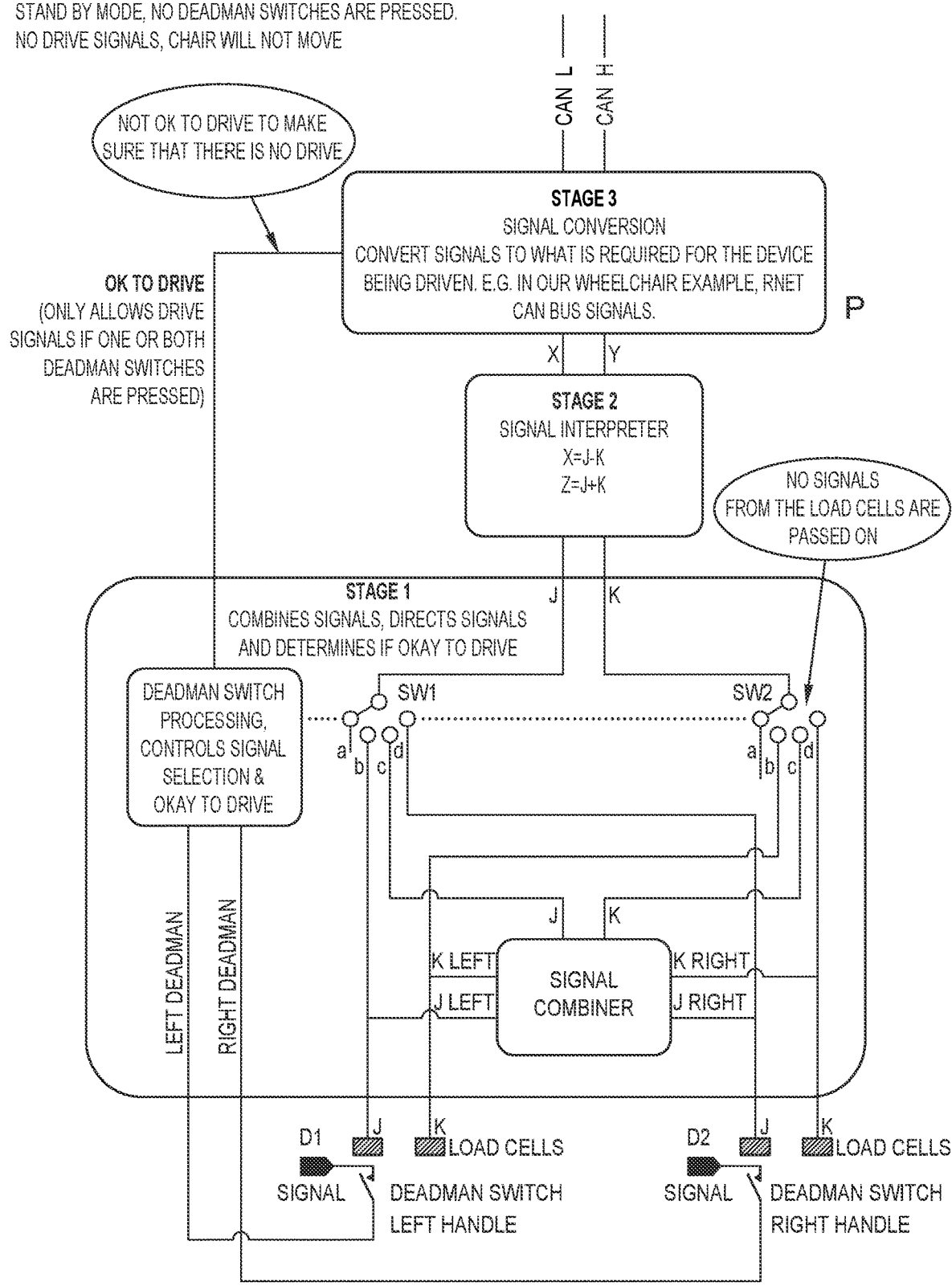
FIG. 5 illustrates an electrical schematic of a first mode of operation according to an embodiment of the present invention.

FIG. 5 illustrates an electrical schematic of a first mode of operation according to an embodiment of the present invention. This first mode is STANDBY mode. No deadman switch(es) D1 and D2 is sensed activated. Switches SW1 and SW2 are in an open position prohibiting electrical signals from the load cells passing further to the drive mechanism of the present invention. In this mode, there are no X and Z drive signals provided to the drive mechanism, and thus the chair will not move.

Figure 6:
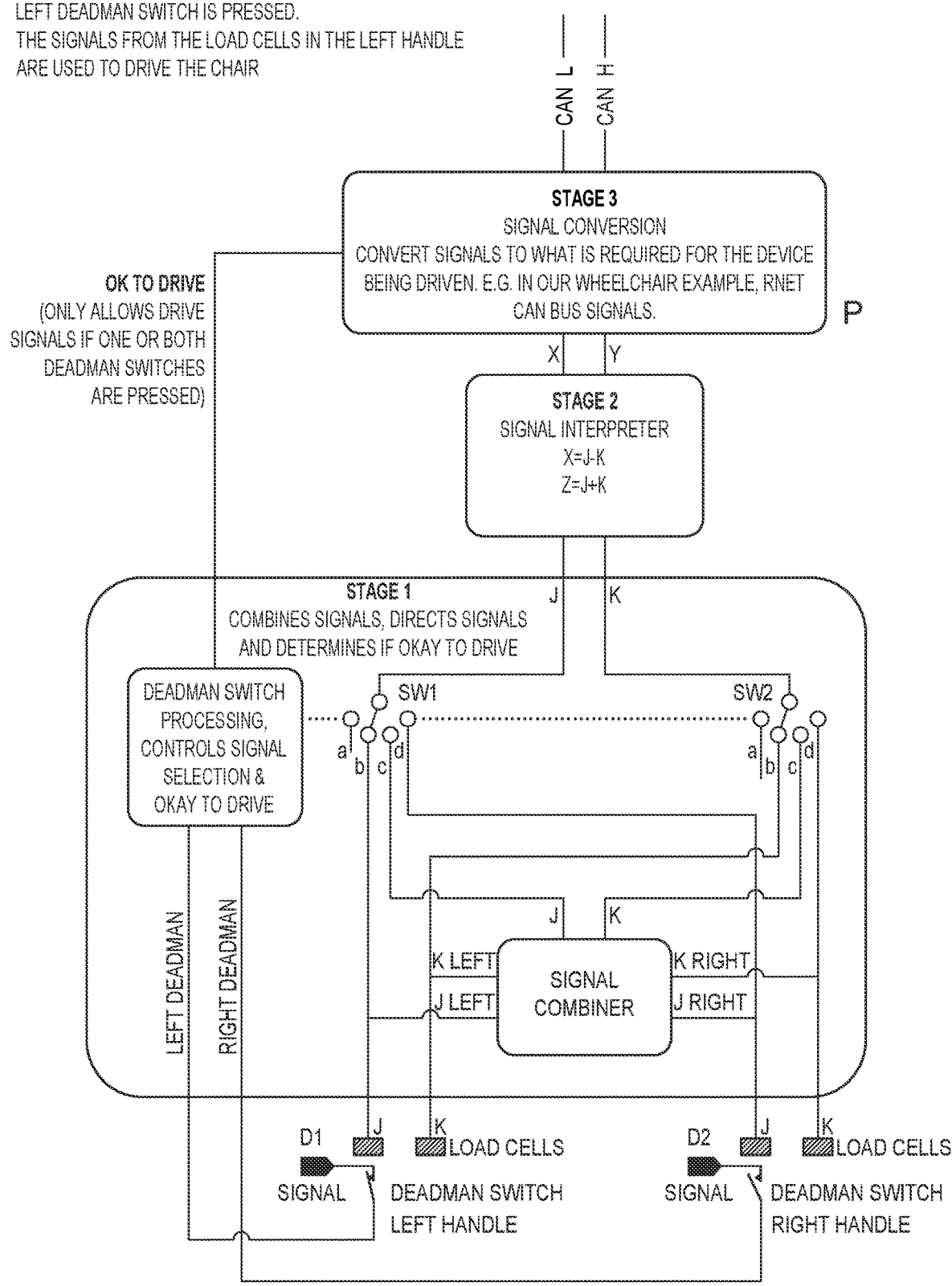
FIG. 6 illustrates an electrical schematic of a second mode of operation according to an embodiment of the present invention.

FIG. 6 illustrates an electrical schematic of a second mode of operation according to an embodiment of the present invention. This second mode is LEFT HAND DRIVE mode. The deadman switch D1 is sensed activated and switch D2 is not pressed nor sensed activated. Switches SW1 and SW2 are oriented to pass the left load cell J and K signals to the Stage 2 signal interpreter stage and along to Stage 3 for the driving mechanism. The deadman switch D1 also acts as an enabling latch for the Stage 3 signal processing by signal processor P of the present invention. In this mode, the J and K signals from the left handle load cell are used to activate the drive mechanism of the present invention and thus the chair will move according to forces imparted upon the left hand handle of the wheelchair (for example) in which the present invention is implemented.

Figure 7:
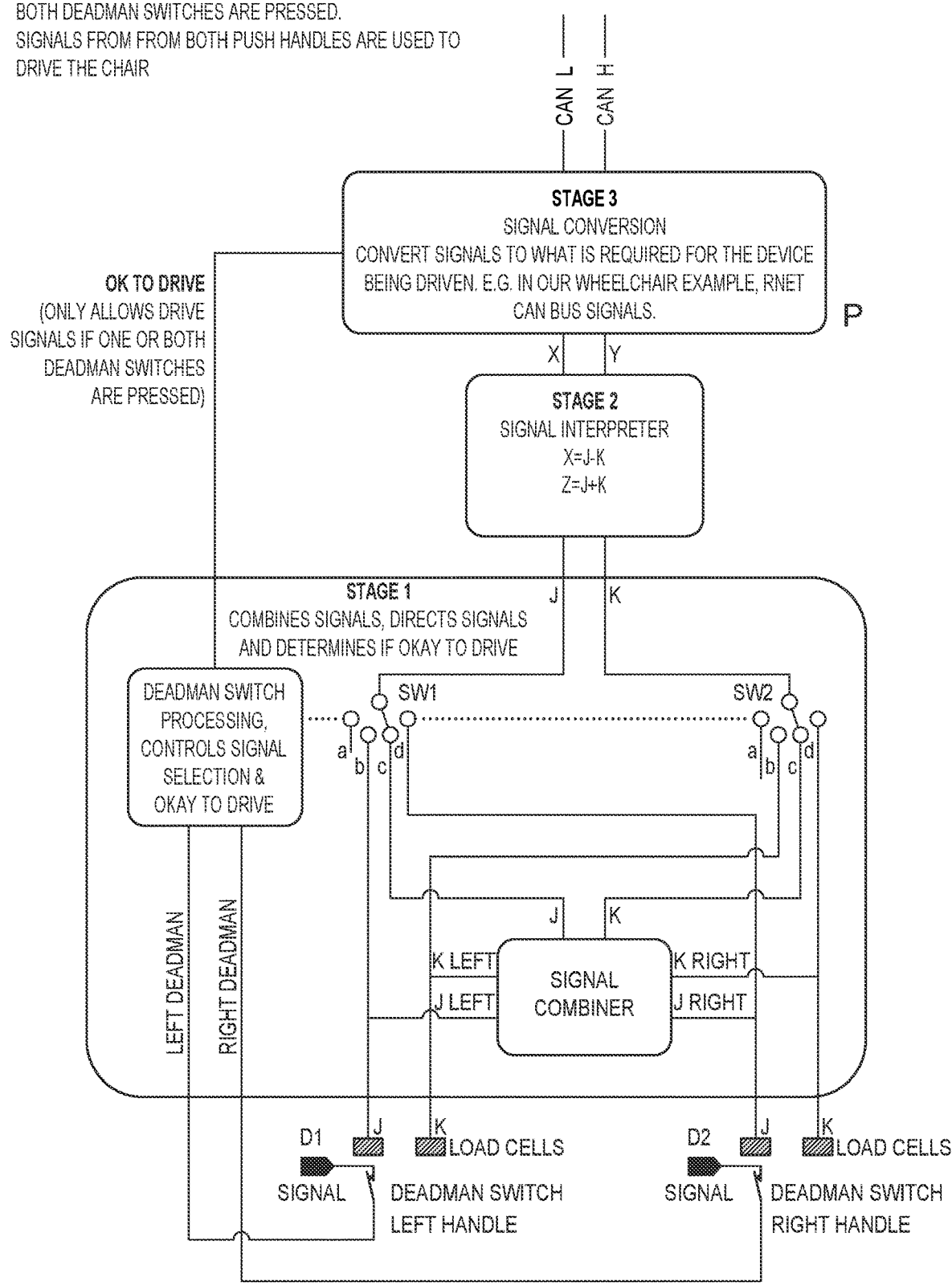
FIG. 7 illustrates an electrical schematic of a third mode of operation according to an embodiment of the present invention.

FIG. 7 illustrates an electrical schematic of a third mode of operation according to an embodiment of the present invention. This third mode is DUAL DRIVE mode. Both the deadman switches D1 and D2 are sensed activated. Switches SW1 and SW2 are oriented to pass both the J and K signals from loads cells in both the left and right handles to the Stage 2 signal interpreter stage and along to Stage 3 for the driving mechanism. In Stage 2, the Signal interpreter, the output from the signal combiner is used to provide implementations that include but are not limited to;

a. Push pull steering only, the handles ignore axial forces (X) and only respond to longitudinal forces (Z) for steering. This is achieved when J=avg (K left & J left), and K=avg (K right & J right);

b. Both Push pull forces and axial forces generate steering commands. E.g., the chair will turn in response to push/pull forces between the 2 handles (eg a difference in Z value), and will also turn if there are axial (X) forces on both handles. In this mode, the J and K signals from both the right and the left handle load cells are resolved in the Signal Combiner and used to activate the drive mechanism of the present invention. Alternatively, the J and K signals may be converted to digital signals and the digital signals as well as the deadman switch signals may be sent to a microcontroller and/or microprocessor and digitally processed and used to activate the drive mechanism of the present invention and thus the chair will move according to forces imparted upon both the right and the left hand handles of the wheelchair (for example) in which the present invention is implemented.

Figure 8:
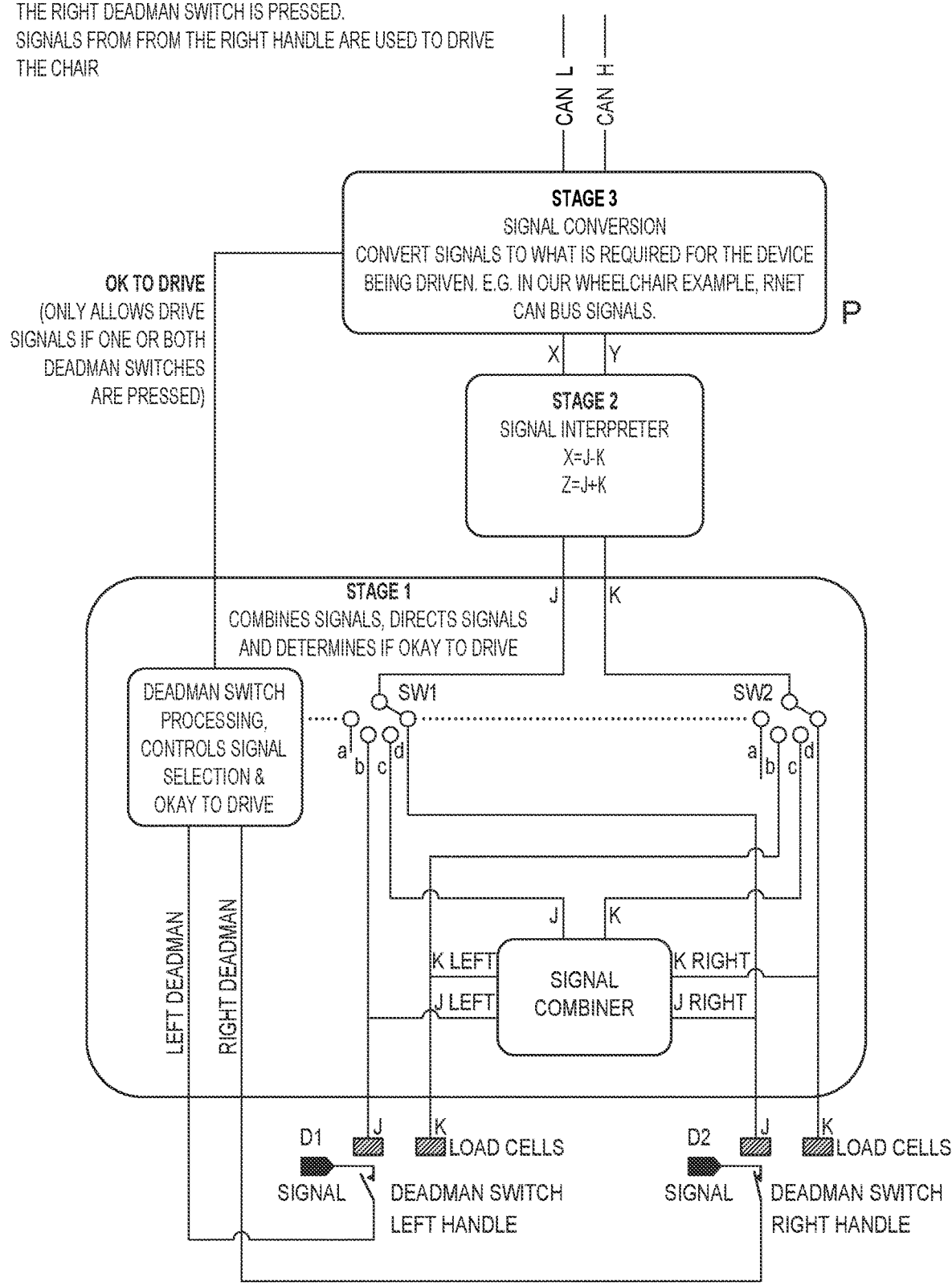
FIG. 8 illustrates an electrical schematic of a fourth mode of operation according to an embodiment of the present invention.

FIG. 8 illustrates an electrical schematic of a fourth mode of operation according to an embodiment of the present invention. This fourth mode is RIGHT HAND DRIVE mode. The deadman switch D2 is sensed activated and switch D1 is not pressed nor sensed activated. Switches SW1 and SW2 are oriented to pass the J and K signals from the right hand load cell to the Stage 2 signal interpreter stage and along to Stage 3 for the driving mechanism. The deadman switch D2 also acts as an enabling latch for the Stage 3 signal processing by signal processor P of the present invention. In this mode, the signals from the right handle load cell are used to activate the drive mechanism of the present invention and thus the chair will move according to forces imparted upon the right hand handle of the wheelchair (for example) in which the present invention is implemented.

Figure 9A:
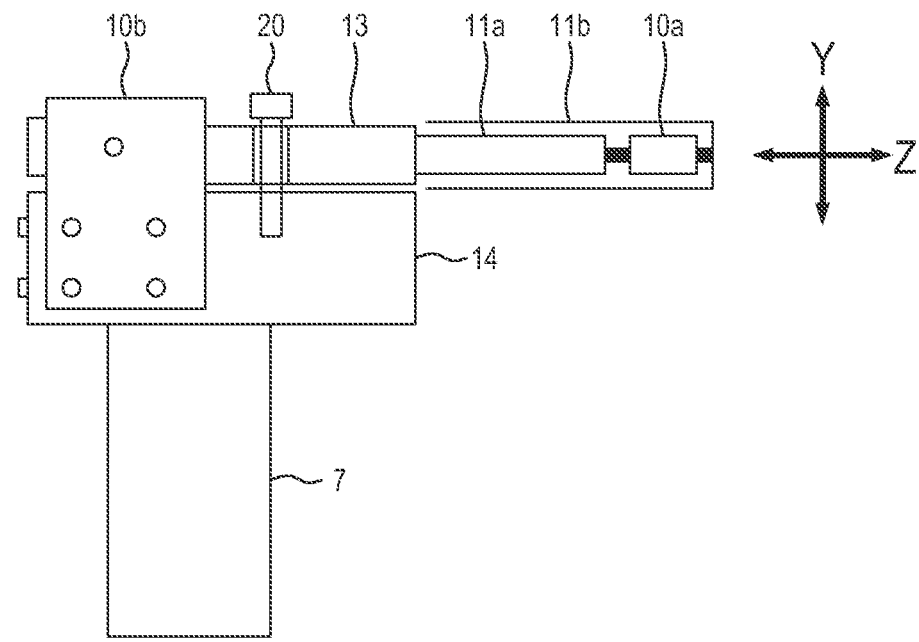
FIG. 9A and FIG. 9B illustrate in perspective view a further embodiment of a controller according to the present invention in side view (FIG. 9A) and top view (FIG. 9B)
Figure 9B:
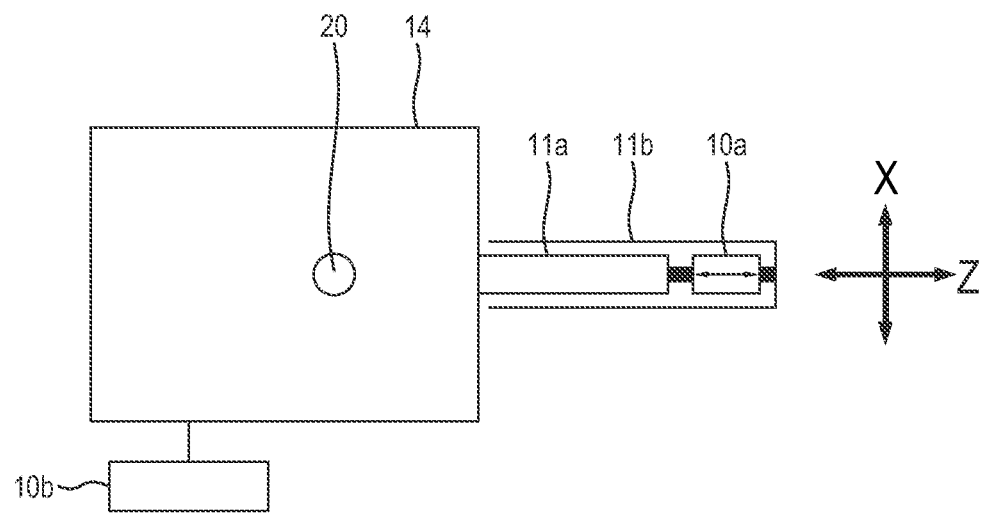

FIGS. 9A and 9B depict another preferred embodiment. In this embodiment, the side view of a controller shown in FIG. 9A comprises just two metal plates (13, 14). The lower plate (14) is attached to a support (7) on the vehicle, such as the handle of a wheelchair. The upper plate (13) is attached to a first sensor (10b) and handle (part 11a) and has some freedom to rotate around bolt (20), subject to the application of the bolt (20) holding the two plates (13,14) in proximity. The handle contains the second sensor (10a) that is attached between the handle parts (11a) and a sliding outer handle sleeve (11b). The first sensor (10b) will therefore measure the forces in the X-axis direction only while the second sensor (10a) will measure forces in the Z-axis direction only. Both sensors (10a) and (10b) will remain unaffected by forces imparted in the Y-axis direction. As in example 1 above, leaning on the handles has no effect on the control forces in the X or Z-axis directions.

FIG. 9B illustrates a top plan view of the controller of FIG. 9A. In this view the first sensor (10b) and the second sensor (10a) can both be seen, along with the handle parts (11a) and (11b) and one of the plates (14).

The signal processor P receiving the signals from the sensors can also apply a number of algorithms to ensure that the control of the vehicle is smooth, simple, safe and intuitive. The signal processor is thus adapted to operate in accordance with a predetermined instruction set.

The algorithms used can be configured, for example, to detect the tilting back of a wheelchair to allow the front ground engaging means (eg castors), followed by the main wheels, to climb over a gutter, step or other similar obstacle. On a wheelchair that has no power assist, the process is generally as follows: The wheelchair is pushed in the forward direction. On approaching a step, the attendant will stop the wheelchair before pulling back sharply on the handles. The chair tilts backwards as a result of this action. The chair can now be pushed forwards in the tilted position until the main wheels hit the step. The attendant then manoeuvres the wheelchair to allow the main wheels to negotiate the step (up or down). Once the step has been negotiated the operation resumes as normal with the chair being pushed forward on the flat ground beyond the step.

The controller of the present invention may comprise further components such as an accelerometer to measure the tilt angle of the chair and a gyroscopic sensor to measure the rate at which the chair is being tilted. The algorithm in the signal processor P can be configured to detect actions such as;

stopping of the wheelchair, then
the signal from the handles indicating that the attendant is pulling sharply back on the handles, then
tilting backwards of the chair, then
the tilting of the wheelchair back beyond a certain threshold angle until it is not tilted further.

If this sequence of events has been completed the signal processor P may identify this condition as one where the chair is being tilted backwards by the attendant to negotiate an obstacle such as a step. The drive signal to the motors of the ground engaging members can therefore be applied appropriate to this condition. Once the controller detects that the chair has tilted forwards again normal drive for forwards travel can again be applied to the ground engaging members.

Thus the combination of signal sensors and an intelligent signal processor can be used to "understand" the intentions of the attendant and thus apply appropriate power to the ground engaging members to assist the attendant with his intended action.

Various embodiments of the invention may be embodied in many different forms, including computer program logic for use with a processor (e.g., a signal processor, microcontroller, digital signal processor, or general purpose computer and for that matter, any commercial processor may be used to implement the embodiments of the invention either as a single processor, serial or parallel set of processors in the system, programmable logic for use with a programmable logic device, discrete components, integrated circuitry, or any other means including any combination thereof).

The controller might also include a display to inform the attendant or operator of the current state of the vehicle, fault conditions and/or battery charge state.

Figure 10A:
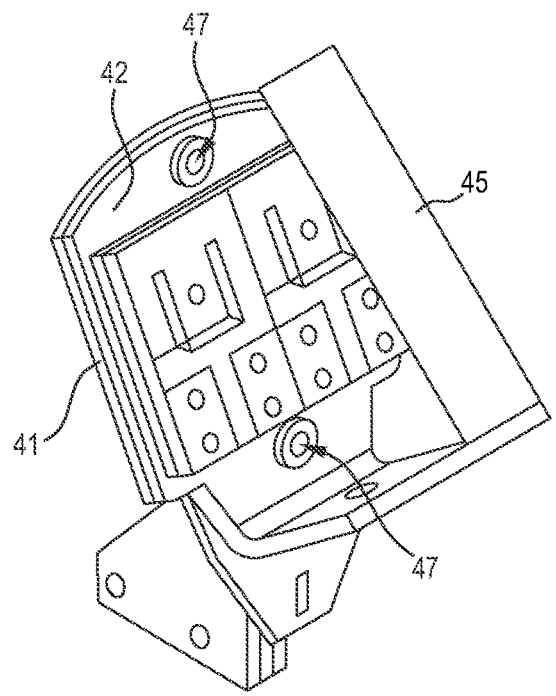
FIG. 10A, FIG. 10B and FIG. 10C illustrate one embodiment of the handle of the present invention with bracket in perspective view (FIG. 10A), side view (FIG. 10B) and plan view (FIG. 10C)
Figure 10B:
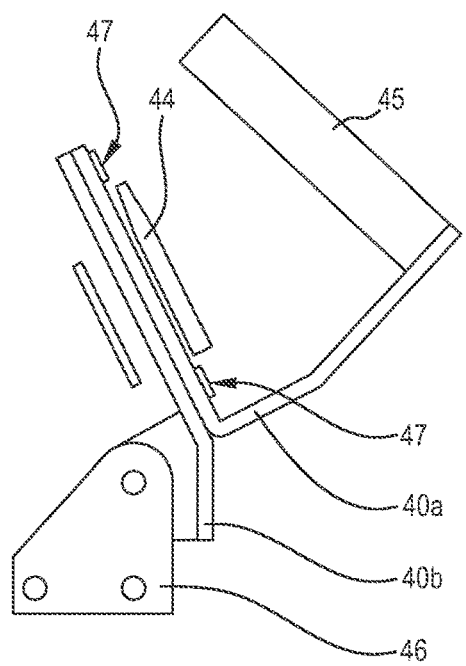

FIG. 10 illustrates a further embodiment of the device of the present invention. Specifically, in this embodiment there can be seen:
fixed base (41)
handle mounting plate (42)
loadcells (44) measuring the forces between points 41 and 42
the contact surface (45)
assembly mounting plate (46) that holds the handle assembly to the vehicle
mounting plate guide bolts (47)

The two loadcells 44 are fixed at one end to the handle mounting plate or bracket (42) and at the other end to the fixed base (41) in such a way as to measure the force between the handle mounting plate (42) and the fixed base (41). The driving force (direction Z) and steering forces (direction X) applied by the operator to the handle (45) are transferred via the handle mounting plate (42) to each of the loadcells (44). Steering and driving forces applied to the contact surface (45) in the form of a handle, are mechanically converted by the arrangement shown in FIG. 10C into forces in the J and K direction to be measured and converted to electrical signals by their respective loadcells (44)

Figure 10C:
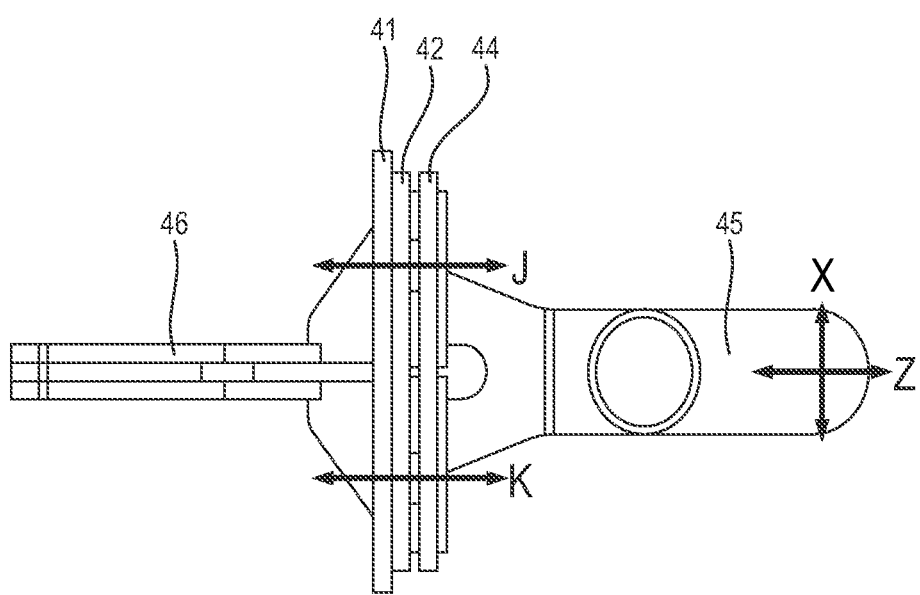

The signals from the loadcells (44) can then be used by an electronic controller to control the drive motors of a vehicle to which they are connected. The mechanical arrangement shown in FIG. 10C illustrates the direction of the driving force in the X-axis and the steering force in the Z-axis. Forces applied in the Y-axis (ie in the vertical plane) are effectively ignored.

Figure 11A:
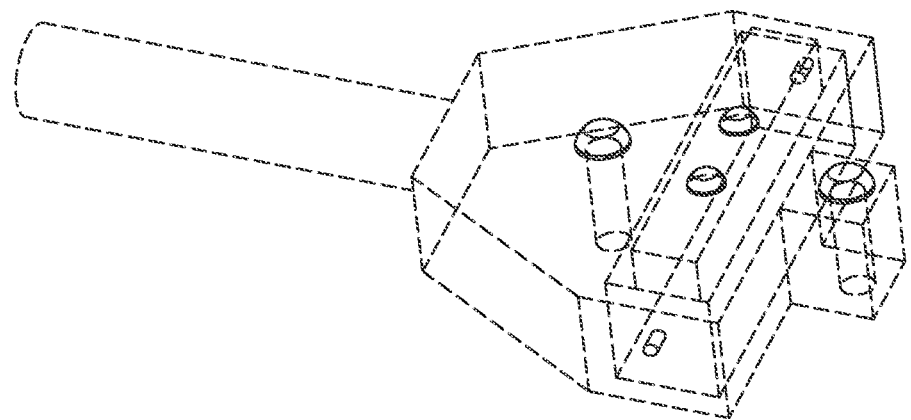
FIG. 11A, FIG. 11B and FIG. 11C illustrate an embodiment of a double ended loadcell assembly for the present invention in perspective view (FIG. 11A), top view (FIG. 11B) and side view (FIG. 11C)
Figure 11B:
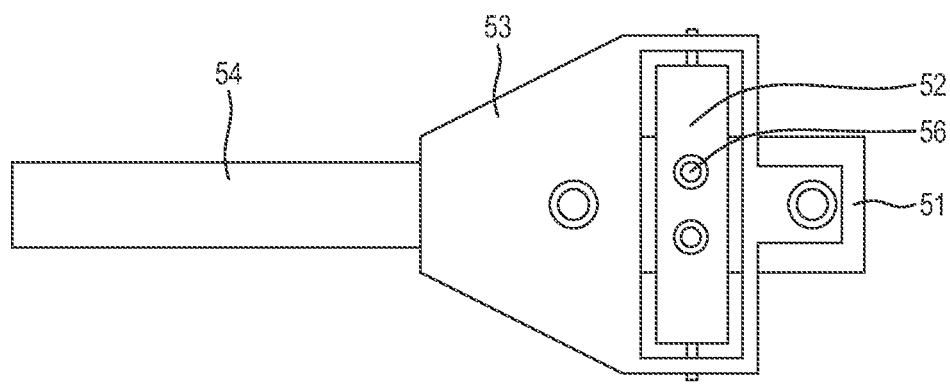
Figure 11C:
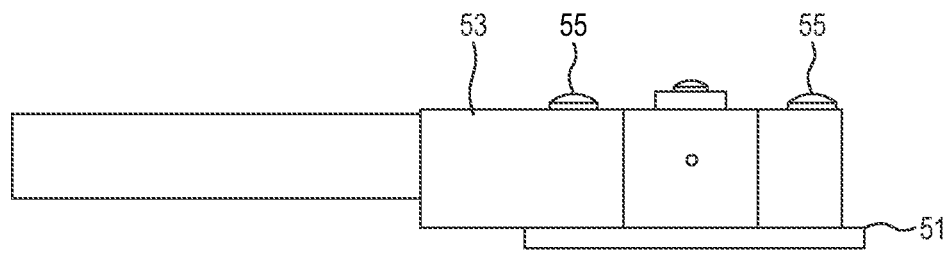

FIGS. 11A, 11B and 11C illustrate an embodiment of a double ended loadcell assembly for the present invention. Specifically, in this embodiment there can be seen:

mounting base (51) fixed to the vehicle
double ended loadcell (52a, 52b) measuring the forces on the handle (54)
connecting frame (53)
contact surface (54)
handle body guide bolts (55) (see FIG. 6C)
loadcell fixing bolts (56)

Figure 12:
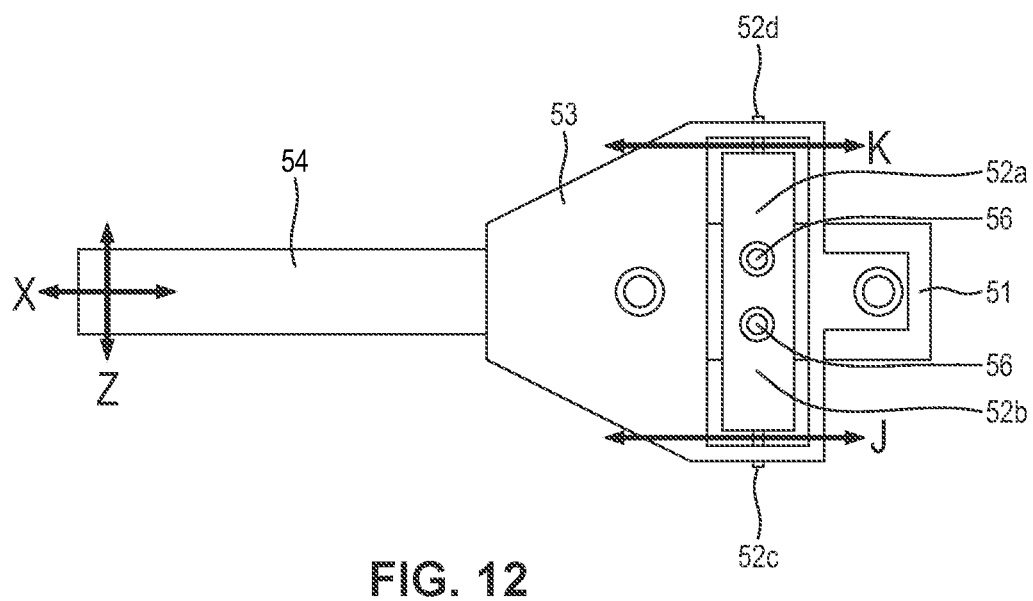
FIG. 12 illustrates operation of the handle depicted in FIGS. 11A. 11B and 11C.

FIG. 12 illustrates the operation in further detail. The double ended loadcell (52a, 52b) is fixed to the mounting base (51) by the fixing bolts (56). The driving forces (X direction) and steering force (Z direction) applied by the operator on the handle (54) are transferred via the connecting frame (53) to each of the loadcell measuring elements (52a, 52b) by the connecting pins (52c, 52d). Steering and driving forces applied to the contact surface (54) are mechanically converted by the arrangement shown in FIG. 12 into forces in the J-direction and K-direction to be measured and converted to electrical signals by the respective load cell elements (52a, 52b).

The signals from the loadcells (52a, 52b) can be used by an electronic controller to control the drive motors of the vehicle to which it is connected. The mechanical arrangement of FIG. 12 shows the driving force in the X-axis and the steering force in the Z-axis. Forces applied in the Y-axis (ie in the vertical plane) are effectively ignored.

Figure 13:
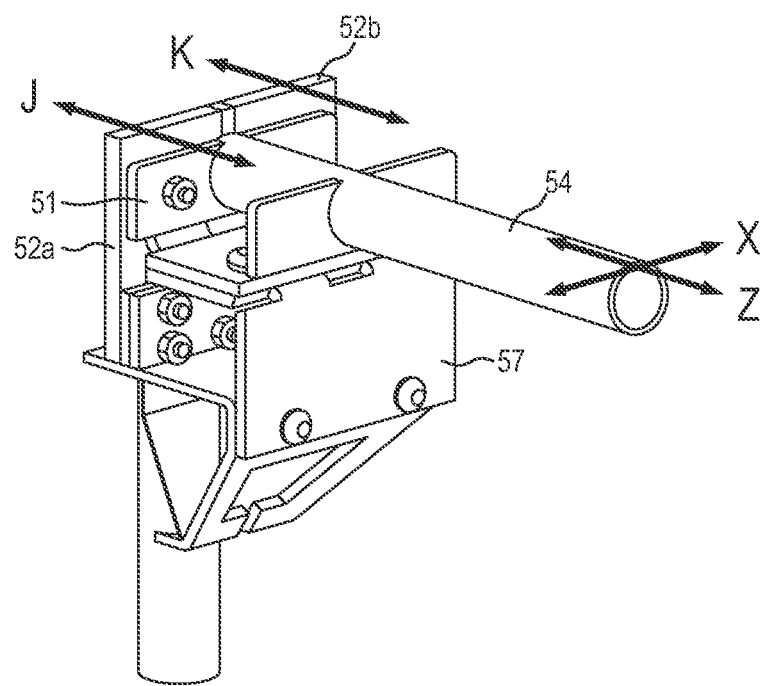
FIG. 13 illustrates the operation of a further embodiment of device according to the present invention.

FIG. 13 illustrates operation of a further embodiment of the handle. The two load cells (52a, 52b) are fixed at one end to the handle bracket (51) and at the other end to the mounting base (57) in such a way as to measure the force between the handle bracket (51) and the mounting base (57). The driving and steering forces applied by the operator on the contact surface (54) are transferred via the handle bracket (51) to each of the loadcells (52a, 52b). Steering and driving forces applied to the contact surface (54) are mechanically converted by the arrangement shown in FIG. 13 in to forces in the direction of the arrows (J and K) to be measured and converted to electrical signals by loadcell elements (52a, 52b) respectively.

The signals from the loadcells (52a, 52b) can then be used by an electronic controller to control the drive motors of the connected vehicle. The mechanical arrangement of FIG. 13 illustrates how the driving force in the X-axis direction (X) and Y-axis direction are effectively ignored.

Figure 14:
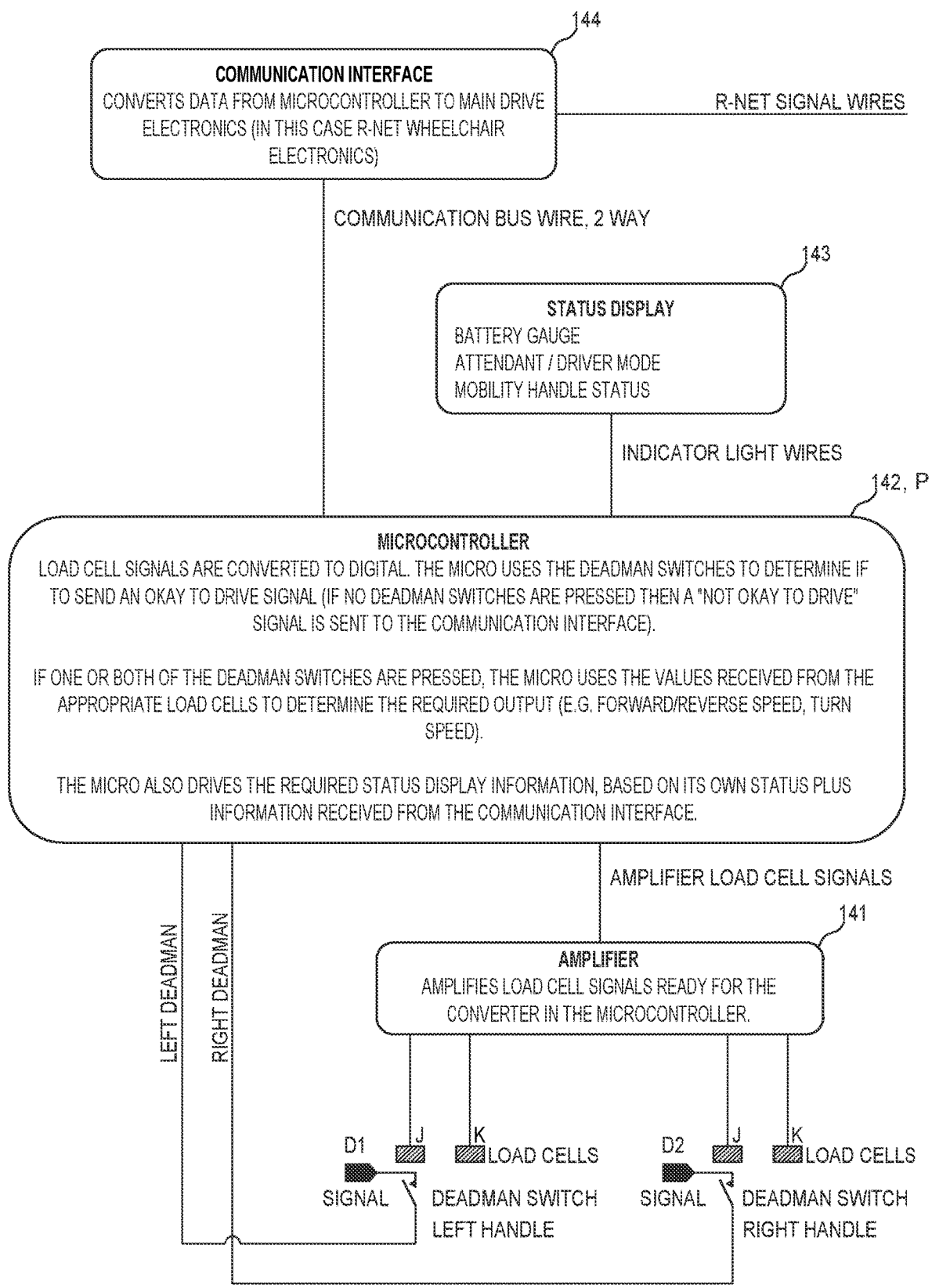
FIG. 14 illustrates a schematic of another embodiment of the present invention.

FIG. 14 illustrates a schematic of another embodiment of the present invention which represents a more digital implementation of the embodiments illustrated in FIGS. 5 to 8. In the embodiment of FIG. 14, the left handle, its corresponding deadman switch D1 and load cells provide J, K input signals when activated to amplifier 141. Similarly, the right handle, its corresponding deadman switch D2 and load cells provide J, K input signals when activated to amplifier 141. The amplifier 141 processes the load cell signals ready for an analogue to digital converter within the microcontroller 142.

The microcontroller 142 converts the load cell signals received to a digital signal. The microcontroller further uses signal(s) received from the deadman switches to determine the 4 modes of operation as described above, the mode being dependent on which 'Deadman' switch activation in each handle.

Mode 1—STANDBY mode—both switches D1 and D2 are released (system knows that the person is not controlling the chair at the moment)

Mode 2—Single Control mode, LEFT HAND control mode—switch D1 of the Left mobility handle is pressed (system knows that only the left hand is being used)

Mode 3—DUAL control mode—switches D1 and D2 of both mobility handles are pressed (system knows that both hands are being used). Steering signal (X) is determined by the difference in signals between the Left and Right handle. Mode 3 may also be embodied to respond in addition to, or instead of, lateral or rotational forces as applied to one or two handles.

Mode 4—Single Control mode, RIGHT HAND control mode—safety switch of the Right mobility handle is pressed (system knows that only the right hand is being used).

The microcontroller also drives the status display 143 and the communication interface 144, which in turn provides signals to the drive mechanism.

A further embodiment of aspects of invention also include a unique drive mechanism operation via inputs to the controller responsive to forces as applied to operator handle (s). With the present embodiment, push force is applied to accelerate up to a desired speed, and then the operator may 'relax' or apply less/smaller force in order to maintain speed and only apply further push or pull forces to the respective handles when it is required to increase or reduce the speed. In other words, the force as applied to the handles controls the acceleration. The drive will maintain its current status (standing still—no drive operation, or current speed—no acceleration) when there is none or a small force applied to the operator handles. The operator handles are still operational together with the deadman switch activation as disclosed herein.

Figure 15:
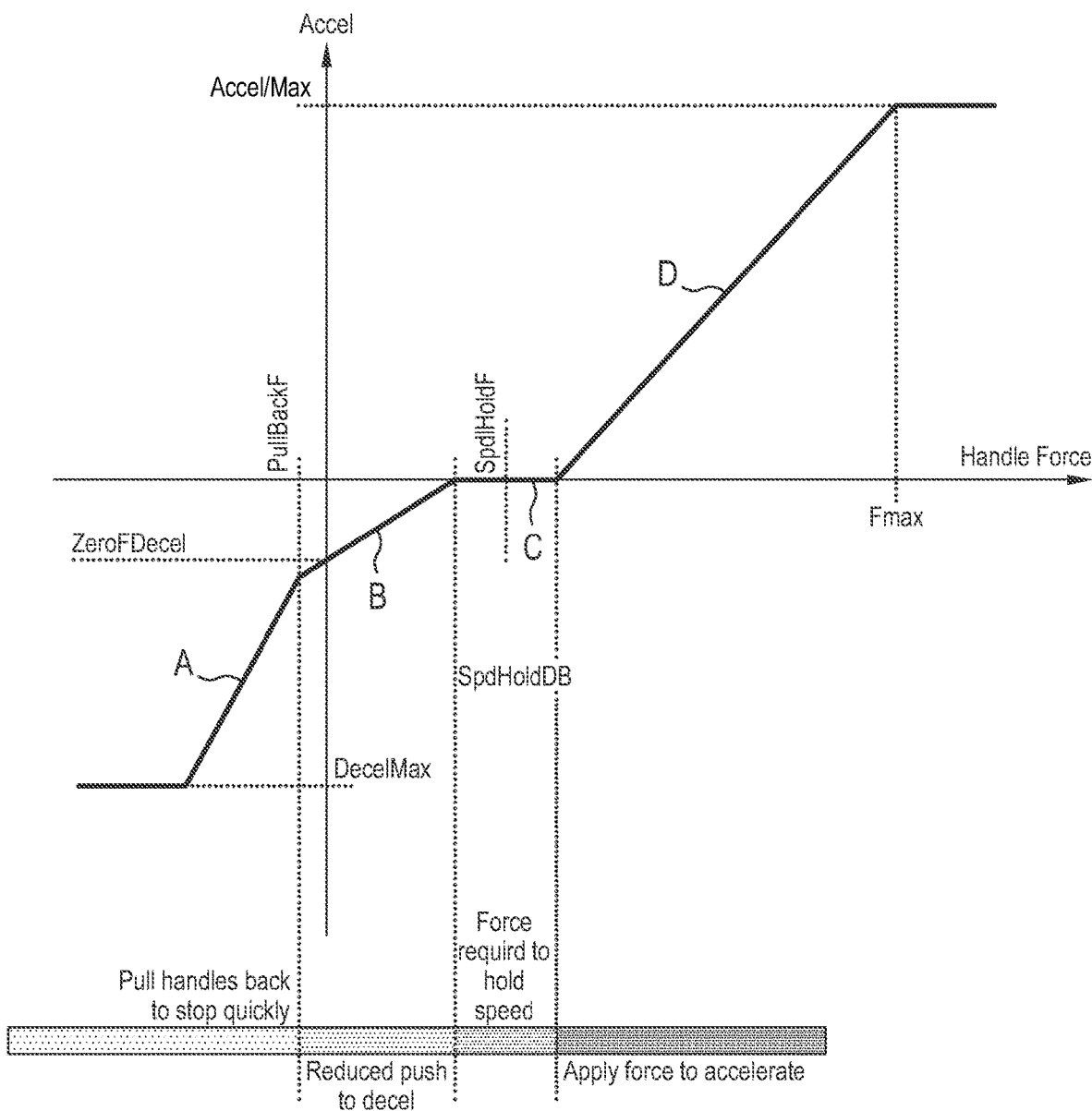
FIG. 15 illustrates a graphical representation of one embodiment of the relationship between force applied to a handle and acceleration as provided by the driven mechanism.

With reference to FIG. 15 which illustrates a graphical representation of force applied to a handle and acceleration as provided by the driven mechanism, the force vs Acceleration for Forward/Reverse directions of travel have different proportional stages, namely A, B, C and D. In Stage C, only a small amount of force, if any, is required to keep the chair moving. This, in effect, mimics pushing a cart along the flat that has a small amount of drag, and which will require a small force to keep it moving.

The four stages can be summarised as:

Step A—stop quickly—the handles are pulled back to stop quickly. The more force, the faster the stop.

Step B—decelerate—none or a small amount of force provides a proportional deceleration.

Step C—hold speed—some more force than Step b will maintain 'hold' current speed of travel.

Step D—accelerate—as the handles are pushed harder, there is increased acceleration.

Figure 16:
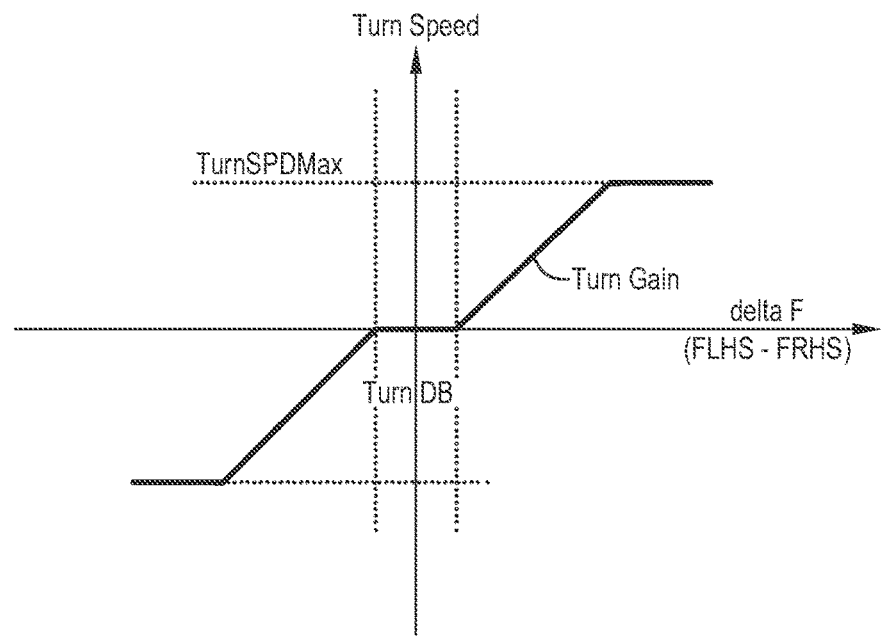
FIG. 16 illustrates a graphical representation of one embodiment of the relationship between turn speed of the mobility device as provided by a difference in force as applied to both handles.

FIG. 16 illustrates a graphical representation of turn speed of the mobility device as provided by a difference in force as applied to both handles. Turn speed is sensed by analysing if there is a difference in force as applied to both operator handles. If the difference in force is greater than the range TurnDB (as illustrated), the inputs to the controller will cause the mobility device to turn. If Delta F (as illustrated) is negative, the mobility device will turn one way, and if the Delta F is positive, the device will turn the other way. The amount of Delta F determines the speed of the turn in the respective direction. A maximum turn speed may be provided.

Figure 17:
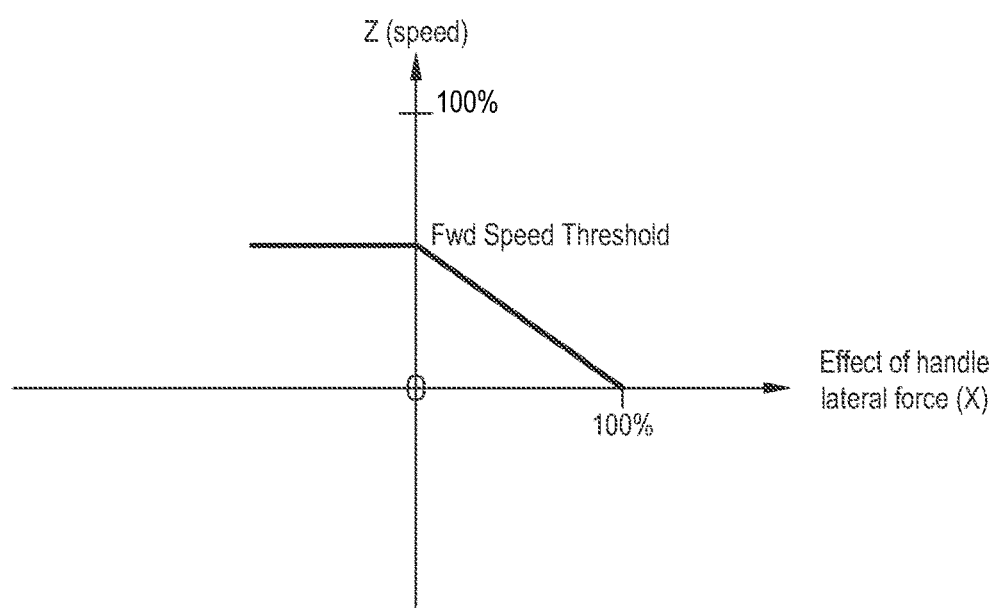
FIG. 17 illustrates a graphical representation of one embodiment of the relationship between turn speed and forward speed relative to lateral force on a handle.

FIG. 17 illustrates a graphical representation of the relationship between turn speed and forward speed relative to lateral force as applied to a handle. When both handles have a lateral force applied, the turn speed as a result of the lateral force will approach zero as the speed of the mobility device approaches the forward speed threshold. FIG. 17 applies only to laterally applied forces. FIG. 16 applies at any speed.

This aspect of invention provides that the mobility device operation is responsive to the force on the handles which in turn determine the "acceleration" of the chair (not the speed). This allows the mobility device to be more responsive to handle input changes at any speed.

In some prior art arrangements, the amount of force exerted in pulling or pushing the cart controls the speed in which the cart is moved. They use force to control the speed of the device being pushed, that is to keep the device being pushed moving, force must keep being applied. For example, if a wheelchair is travelling at maximum speed, the handles must keep being pushed with a maximum force continuously. This is difficult to maintain.

Again, with the present inventive arrangement, the operation is more like pushing a nice well maintained (free running) manual wheelchair along flat ground. You apply push force to accelerate up to speed, and then you 'relax' and or apply less/smaller force in order to maintain speed and only apply further push or pull forces to the respective handles when it is required to increase or reduce the speed. (e.g. the force you apply controls the acceleration). Having the force controlling the acceleration is a key part of the present invention where an operator is walking behind the object that is being 'pushed'. It has been found that using force sensors, with the value controlling acceleration appear to be the most intuitive as it most closely mimics pushing a manual device and also reduces fatigue that would otherwise occur if you had to maintain push force when travelling at a constant speed. The use of Deadman switch system will cause the device to stop travelling at its existing speed when the handles are let go.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features set out above.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. The described embodiments are to be considered in all respects as illustrative only and not restrictive.

Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures.

Computer program logic implementing all or part of the functionality where described herein may be embodied in various forms, including a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language. Moreover, there are hundreds of available computer languages that may be used to implement embodiments of the invention.

The computer program may be fixed in any form (e.g., source code form, computer executable form, or an intermediate form) either permanently or transitorily in a tangible storage medium, such as a semiconductor memory device, a magnetic memory device, an optical memory device, a PC card, or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic implementing all or part of the functionality where described herein may be designed using traditional manual methods, or may be designed, captured, simulated, or documented electronically using various tools, such as Computer Aided Design (CAD), a hardware description language, or a PLD programming language. Hardware logic may also be incorporated into display screens for use with the invention and which may be segmented display screens, analogue display screens, digital display screens, CRTs, LED screens, Plasma screens, liquid crystal diode screen, and the like.

Programmable logic may be fixed either permanently or transitorily in a tangible storage medium, such as a semiconductor memory device, a magnetic memory device, an optical memory device, or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation, preloaded with a computer system, or distributed from a server or electronic bulletin board over the communication system.

"Comprises/comprising" and "includes/including" when used in this specification is taken to specify the presence of stated features, integers, steps or components but does not preclude the presence or addition of one or more other features, integers, steps, components or groups thereof. Thus, unless the context clearly requires otherwise, throughout the description and the claims, the words 'comprise', 'comprising', 'includes', 'including' and the like are to be construed in an inclusive sense as opposed to an exclusive or exhaustive sense; that is to say, in the sense of "including, but not limited to".

The invention claimed is:

1. A controller adapted to enable control of a drive mechanism for a power assisted transport vehicle that is at least partially directed by a human operator in physical contact with the vehicle, the controller including:
   at least one contact surface associated with the transport vehicle, and having a switch associated with the contact surface;

a first sensor and a second sensor each responsive to actuation of at least one contact surface, each sensor having a respective first sensor output signal and a second sensor output signal; and a signal processor adapted to process the first and second output signals, and impart corresponding drive control signals to the drive mechanism, wherein the signal processor provides a selection of predetermined modes of operation of the controller in response to the switch being activated or not activated, and wherein there are four modes of operation.

2. A controller as claimed in claim 1, wherein the switch is a deadman switch.

3. A controller as claimed in claim 1, wherein the controller controls acceleration of the drive mechanism.

4. A controller as claimed in claim 3, wherein the amount of acceleration is determined by the force sensed.

5. A controller as claimed in claim 3, wherein the amount of turn speed is determined by the lateral force sensed.

6. A controller as claimed in claim 1, wherein the predetermined modes of operation are, any one of:
   Mode 1—STANDBY mode no sensor(s) are activated;
   Mode 2—LEFT HAND mode—the sensor on a left hand contact surface for left handed operation is activated;
   Mode 3—DUAL mode—a left hand sensor on a left hand contact surface and a right hand sensor on a right hand surface are both activated; and
   Mode 4—RIGHT HAND mode—the sensor on a right hand contact surface for right handed operation is activated.

7. A controller according to claim 6, wherein the human operator may alternate between any one of the modes while the vehicle is in operation.

8. A controller according to claim 1, wherein the at least one contact surface is chosen from the group comprising a handle, joystick, contact pad or headrest.

9. A controller according to claim 1, wherein the actuation comprises physical force imparted by a body part of the operator.

10. A controller according to claim 9, wherein the switch activation is continuously applied.

11. A controller according to claim 1, wherein the actuation of the contact surface occurs when physical force is imparted by a body part.

12. A controller according to claim 11, wherein the body part is chosen from the hand, head, arm, shoulder, finger or leg of the operator.

13. A controller according to claim 1, the controller having a third sensor and a fourth sensor each responsive to actuation of the contact surface, and having a respective third sensor output signal and fourth sensor output signal, the signal processor being adapted to process output signals of all of the sensors.

14. A controller according to claim 1, comprising a further sensor(s), wherein force imparted to the contact surface in the Y-axis is adapted to provide a further sensor output signal to enable a further predetermined function of operation.

15. A controller as claimed in claim 14, wherein the further sensor(s) respond to movement and/or force in a third and/or fourth axis.

16. A controller according to claim 1, comprising a further sensor, wherein force imparted to the contact surface in the Y-axis is adapted to provide a further sensor output signal to enable Y-axis movement of at least part of the vehicle.

17. A method of controlling a power assisted transport vehicle that is at least partially directed by a human operator in physical contact with the vehicle using the controller of claim 1 to enable control of a drive mechanism for the power assisted transport vehicle, the method including the steps of:
   providing the at least one contact surface associated with the transport vehicle, and having the switch associated with the contact surface;
   providing the first sensor and the second sensor each responsive to actuation of at least one contact surface, each sensor having the respective first sensor output signal and the second sensor output signal; and
   providing the signal processor adapted to process the first and second output signals, and impart corresponding drive control signals to the drive mechanism in response to the human operator applying force to the contact surface to control the direction and speed of the vehicle, wherein the signal processor provides the selection of the four predetermined modes of operation of the controller in response to the switch being activated or not activated.

18. A method as claimed in claim 17, wherein the predetermined modes of operation are, any one of:
   Mode 1—STANDBY mode—no sensor(s) are activated;
   Mode 2—LEFT HAND mode—the sensor on a left hand contact surface for left handed operation is activated;
   Mode 3—DUAL mode—a left hand sensor on a left hand contact surface and a right hand sensor on a right hand surface are both activated; and
   Mode 4—RIGHT HAND mode—the sensor on a right hand contact surface for right handed operation is activated.

19. A controller according to claim 1 when used for a vehicle chosen from the group comprising electric wheelchairs, forklifts, luggage trolleys, goods trolleys and golf bag buggies.

20. A power assisted transport vehicle comprising the controller of claim 1, wherein the controller is in operative connection with the transport vehicle being at least partially directed by a human operator in physical contact with the vehicle.

21. A controller adapted to enable control of a drive mechanism for a power assisted transport vehicle that is at least partially directed by a human operator in physical contact with the vehicle, the controller including:
   at least one contact surface associated with the transport vehicle, and having a switch associated with the contact surface;
   a first sensor and a second sensor each responsive to actuation of at least one contact surface, each sensor having a respective first sensor output signal and a second sensor output signal; and
   a signal processor adapted to process the first and second output signals, and impart corresponding drive control signals to the drive mechanism,
   wherein the signal processor provides a selection of predetermined modes of operation of the controller in response to the switch being activated or not activated, and wherein the switch is a deadman switch.

22. A controller according to claim 21, wherein there are four modes of operation.

23. A controller as claimed in claim 21, wherein the controller controls acceleration of the drive mechanism.

24. A controller as claimed in claim 23, wherein the amount of acceleration is determined by the force sensed.

25. A controller as claimed in claim 23, wherein the amount of turn speed is determined by the lateral force sensed.

26. A controller as claimed in claim 21, wherein the predetermined modes of operation are, any one of:
 Mode 1—STANDBY mode—no sensor(s) are activated;
 Mode 2—LEFT HAND mode—the sensor on a left hand contact surface for left handed operation is activated;
 Mode 3—DUAL mode—a left hand sensor on a left hand contact surface and a right hand sensor on a right hand surface are both activated; and
 Mode 4—RIGHT HAND mode—the sensor on a right hand contact surface for right handed operation is activated.

27. A controller according to claim 26, wherein the human operator may alternate between any one of the modes while the vehicle is in operation.

28. A controller according to claim 21, wherein the at least one contact surface is chosen from the group comprising a handle, joystick, contact pad or headrest.

29. A controller according to claim 21, wherein the actuation comprises physical force imparted by a body part of the operator.

30. A controller according to claim 21, wherein the deadman switch activation is continuously applied to enable control of the drive mechanism.

31. A controller according to claim 21, wherein the actuation of the contact surface occurs when physical force is imparted by a body part.

32. A controller according to claim 31, wherein the body part is chosen from the hand, head, arm, shoulder, finger or leg of the operator.

33. A controller according to claim 21, the controller having a third sensor and a fourth sensor each responsive to actuation of the contact surface, and having a respective third sensor output signal and fourth sensor output signal, the signal processor being adapted to process output signals of all of the sensors.

34. A controller according to claim 21, comprising a further sensor(s), wherein force imparted to the contact surface in the Y-axis is adapted to provide a further sensor output signal to enable a further predetermined function of operation.

35. A controller as claimed in claim 34, wherein the further sensor(s) respond to movement and/or force in a third and/or fourth axis.

36. A controller according to claim 21, comprising a further sensor, wherein force imparted to the contact surface in the Y-axis is adapted to provide a further sensor output signal to enable Y-axis movement of at least part of the vehicle.

37. A method of controlling a power assisted transport vehicle that is at least partially directed by a human operator in physical contact with the vehicle using the controller of claim 21 to enable control of a drive mechanism for the power assisted transport vehicle, the method including the steps of:
 providing the at least one contact surface associated with the transport vehicle;
 providing the deadman switch associated with at least one of the contact surface(s);
 providing the first sensor and the second sensor each responsive to actuation of at least one contact surface, each sensor having a respective first sensor output signal and a second sensor output signal; and
 providing the signal processor adapted to process the first and second output signals, and impart corresponding drive control signals to the drive mechanism in response to the human operator applying force to the contact surface to control the direction and speed of the vehicle, wherein the signal processor provides the selection of predetermined modes of operation of the controller in response to the deadman switch being activated or not activated.

38. A method as claimed in claim 37, wherein the predetermined modes of operation are, any one of:
 Mode 1—STANDBY mode—no sensor(s) are activated;
 Mode 2—LEFT HAND mode—the sensor on a left hand contact surface for left handed operation is activated;
 Mode 3—DUAL mode—a left hand sensor on a left hand contact surface and a right hand sensor on a right hand surface are both activated; and
 Mode 4—RIGHT HAND mode—the sensor on a right hand contact surface for right handed operation is activated.

39. A controller according to claim 21 when used for a vehicle chosen from the group comprising electric wheelchairs, forklifts, luggage trolleys, goods trolleys and golf bag buggies.

40. A power assisted transport vehicle comprising the controller of claim 21, wherein the controller is in operative connection with the transport vehicle being at least partially directed by the human operator in physical contact with the vehicle.

* * * * *